United States Patent
Elshafie et al.

(10) Patent No.: US 12,396,020 B2
(45) Date of Patent: Aug. 19, 2025

(54) TRANSMISSION COORDINATION TO MITIGATE INTERFERENCE

(71) Applicant: QUALCOMM Incorporated, San Diego, CA (US)

(72) Inventors: Ahmed Elshafie, San Diego, CA (US); Xipeng Zhu, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 17/649,789

(22) Filed: Feb. 2, 2022

(65) Prior Publication Data
US 2023/0247659 A1 Aug. 3, 2023

(51) Int. Cl.
| | |
|---|---|
| *H04W 72/541* | (2023.01) |
| *H04L 1/00* | (2006.01) |
| *H04L 5/00* | (2006.01) |
| *H04W 72/044* | (2023.01) |
| *H04W 72/23* | (2023.01) |
| *H04W 72/27* | (2023.01) |

(52) U.S. Cl.
CPC ......... *H04W 72/541* (2023.01); *H04L 1/0003* (2013.01); *H04L 5/0051* (2013.01); *H04W 72/046* (2013.01); *H04W 72/23* (2023.01); *H04W 72/27* (2023.01)

(58) Field of Classification Search
CPC ...... H04W 72/54; H04W 72/27; H04W 72/23
See application file for complete search history.

(56) References Cited

U.S. PATENT DOCUMENTS

| | | | | |
|---|---|---|---|---|
| 2013/0078991 A1* | 3/2013 | Nam | ...... | H04W 28/04 455/423 |
| 2016/0174194 A1* | 6/2016 | Suzuki | ...... | H04W 76/12 370/312 |
| 2016/0191115 A1* | 6/2016 | Sano | ...... | H04J 11/0043 375/144 |
| 2019/0335471 A1* | 10/2019 | Kim | ...... | H04L 5/0053 |
| 2022/0006688 A1* | 1/2022 | Ryu | ...... | H04L 1/1812 |

FOREIGN PATENT DOCUMENTS

EP 3840460 A1 6/2021

OTHER PUBLICATIONS

International Search Report and Written Opinion—PCT/US2023/010396—ISA/EPO—Apr. 28, 2023.

* cited by examiner

*Primary Examiner* — Sulaiman Nooristany
(74) *Attorney, Agent, or Firm* — Procopio, Cory, Hargreaves & Savitch LLP

(57) ABSTRACT

An apparatus for receiving wireless communication at a first UE from a first wireless device may include a memory and at least one processor coupled to the memory. The memory and the at least one processor may be configured to receive a user grouping identifying a second UE that communicates with a second wireless device. The memory and the at least one processor may be further configured to receive a control transmission between the second UE and the second wireless device indicating a modulation and coding scheme (MCS) and allocated resources for the second wireless device. The memory and the at least one processor may be further configured to apply interference cancellation on at least one of a resource element (RE) or a resource block (RB) received from the first wireless device based on the MCS and allocated resources for the second wireless device.

18 Claims, 15 Drawing Sheets

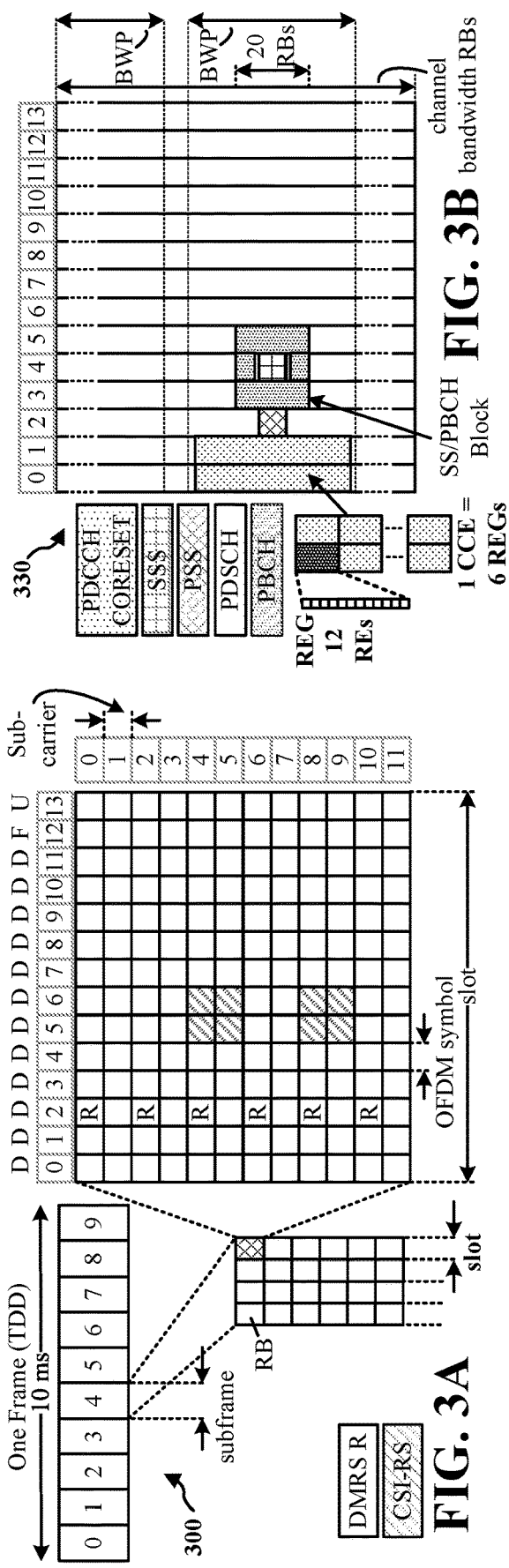
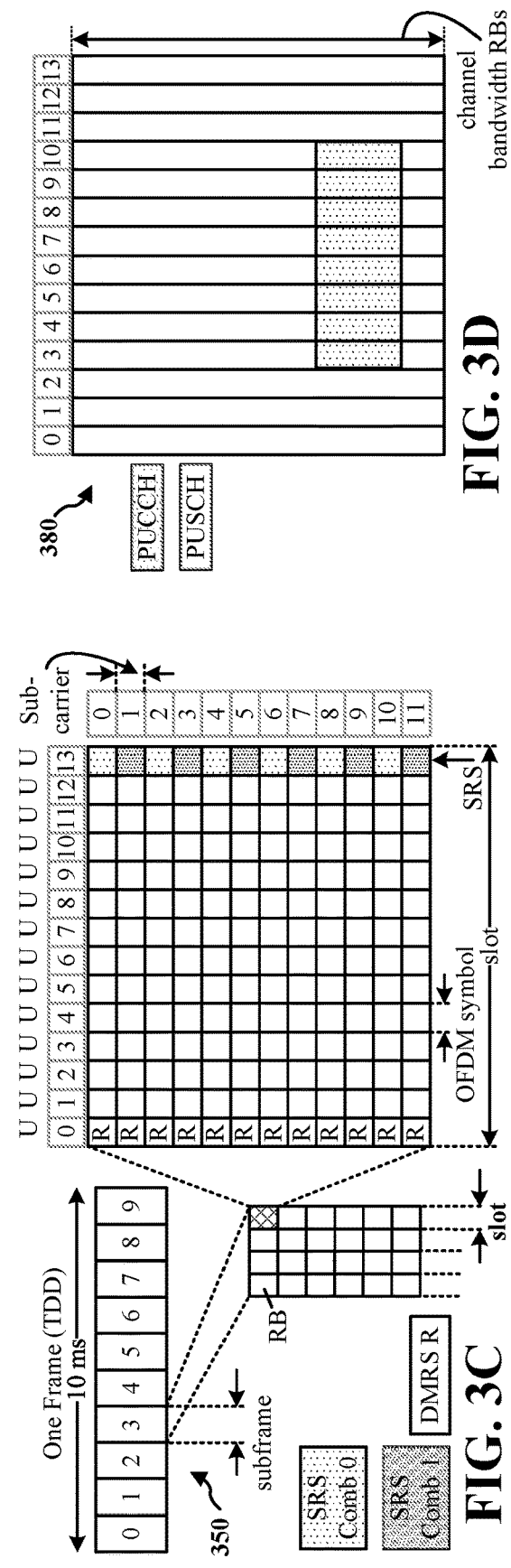

TRANSMISSION COORDINATION TO MITIGATE INTERFERENCE

TECHNICAL FIELD

The present disclosure relates generally to communication systems, and more particularly, to improving the reliability of transmission reception.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for receiving wireless communication at a first user equipment (UE) from a first wireless device is provided. The apparatus may include a memory and at least one processor coupled to the memory. The memory and the at least one processor may be configured to receive a user grouping identifying a second UE that communicates with a second wireless device. The memory and the at least one processor may be further configured to receive a control transmission between the second UE and the second wireless device indicating a modulation and coding scheme (MCS) and allocated resources for the second wireless device. The memory and the at least one processor may be further configured to apply interference cancellation on at least one of a resource element (RE) or a resource block (RB) received from the first wireless device based on the MCS and allocated resources for the second wireless device.

In an aspect of the disclosure an apparatus for wireless communication at a first wireless device is provided. The apparatus may include a memory and at least one processor coupled to the memory. The memory and the at least one processor may be configured to receive a list including one or more UEs from a second wireless device having overlapping beam coverage with a first UE that communicates with the first wireless device. The memory and the at least one processor may be further configured to transmit a user grouping identifying the one or more UEs to the first UE.

In an aspect of the disclosure, a method for receiving wireless communication at a first UE from a first wireless device may include receiving a user grouping identifying a second UE that communicates with a second wireless device. The method may also include receiving a control transmission between the second UE and the second wireless device indicating an MCS and allocated resources for the second wireless device. The method may also include applying interference cancellation on at least one of an RE or an RB received from the first wireless device based on the MCS and allocated resources for the second wireless device.

In an aspect of the disclosure, a method of wireless communication at a first wireless device may include receiving a list including one or more UEs from a second wireless device having overlapping beam coverage with a first UE that communicates with the first wireless device. The method may also include transmitting a user grouping identifying the one or more UEs to the first UE.

In an aspect of the disclosure, an apparatus for receiving wireless communication at a first UE from a first wireless device is provided. The apparatus may include means for receiving a user grouping identifying a second UE that communicates with a second wireless device. The apparatus may also include means for receiving a control transmission between the second UE and the second wireless device indicating an MCS and allocated resources for the second wireless device. The apparatus may also include means for applying interference cancellation on at least one of an RE or an RB received from the first wireless device based on the MCS and allocated resources for the second wireless device.

In an aspect of the disclosure, an apparatus for wireless communication at a first wireless device is provided. The apparatus may include means for receiving a list including one or more UEs from a second wireless device having overlapping beam coverage with a first UE that communicates with the first wireless device. The apparatus may also include transmitting a user grouping identifying the one or more UEs to the first UE.

In an aspect of the disclosure, a computer-readable medium storing computer executable code for receiving wireless communication at a first UE from a first wireless device is provided. The code, when executed by a processor, may cause the processor to receive a user grouping identifying a second UE that communicates with a second wireless device. The code, when executed by the processor, may further cause the processor to receive a control transmission between the second UE and the second wireless device indicating an MCS and allocated resources for the second wireless device. The code, when executed by the processor, may further cause the processor to apply interference cancellation on at least one of an RE or an RB received from the first wireless device based on the MCS and allocated resources for the second wireless device.

In an aspect of the disclosure, a computer-readable medium storing computer executable code for wireless communication at a first wireless device is provided. The code, when executed by a processor, may cause the processor to receive a list including one or more UEs from a second wireless device having overlapping beam coverage with a first UE that communicates with the first wireless device. The code, when executed by a processor, may further cause the processor to transmit a user grouping identifying the one or more UEs to the first UE.

To the accomplishment of the foregoing and related ends, the one or more aspects may include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3A is a diagram illustrating an example of a first frame, in accordance with various aspects of the present disclosure.

FIG. 3B is a diagram illustrating an example of DL channels within a subframe, in accordance with various aspects of the present disclosure.

FIG. 3C is a diagram illustrating an example of a second frame, in accordance with various aspects of the present disclosure.

FIG. 3D is a diagram illustrating an example of UL channels within a subframe, in accordance with various aspects of the present disclosure.

DETAILED DESCRIPTION

Figure 1:
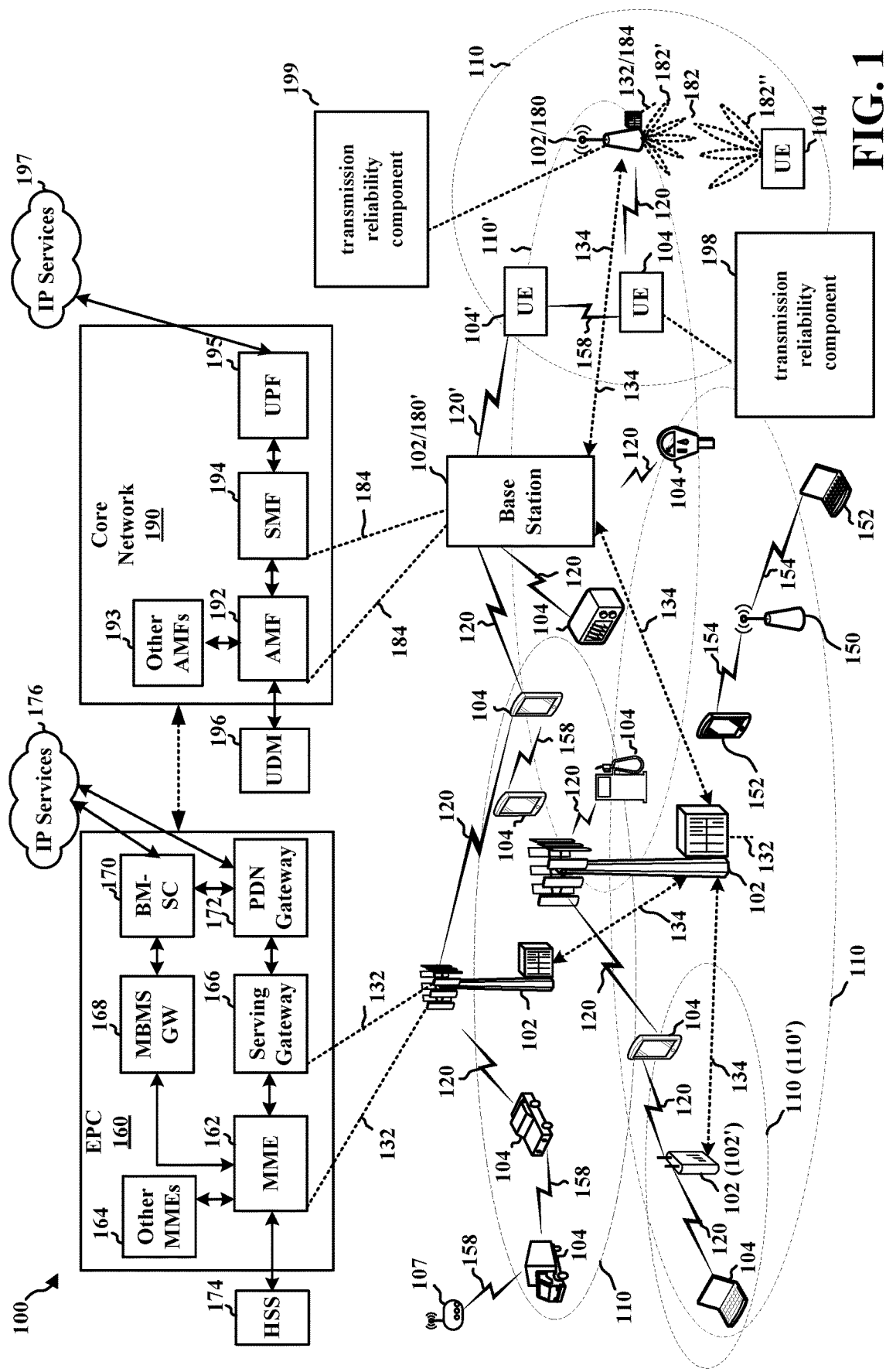
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a BS 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. A V2X communication may include a basic safety message (BSM) Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a first UE 104 may include a transmission reliability component 198 configured to improve the reliability of transmissions under certain conditions, for example where the first UE 104 is configured to communicate with a first BS 180 using a first communication link 120 in a first coverage area 110 that overlaps with a coverage area 110' of a BS 180' that is configured to communicate with a second UE 104' using a second communication link 120' in the overlap between coverage area 110 and coverage area 110'. In certain aspects, the BS 180 may additionally or alternatively include a transmission reliability component 199 configured to improve the reliability of transmissions under similar conditions. One or more transmissions of a first UE 104 communicating with a first BS 180 may interfere with one or more communications of a second UE 104 communicating with a second BS 180. Although the following description may be focused on 5G NR and/or sidelink transmissions, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., Xn interface, X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110 with a plurality of UEs 104 in an intersection of two geographic coverage areas 110 for two different BS's 102/180. The small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. In response to communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. In response to operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. The gNB 180 may be referred to as a millimeter wave base station in aspects where the gNB 180 operates in millimeter wave or near millimeter wave frequencies. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
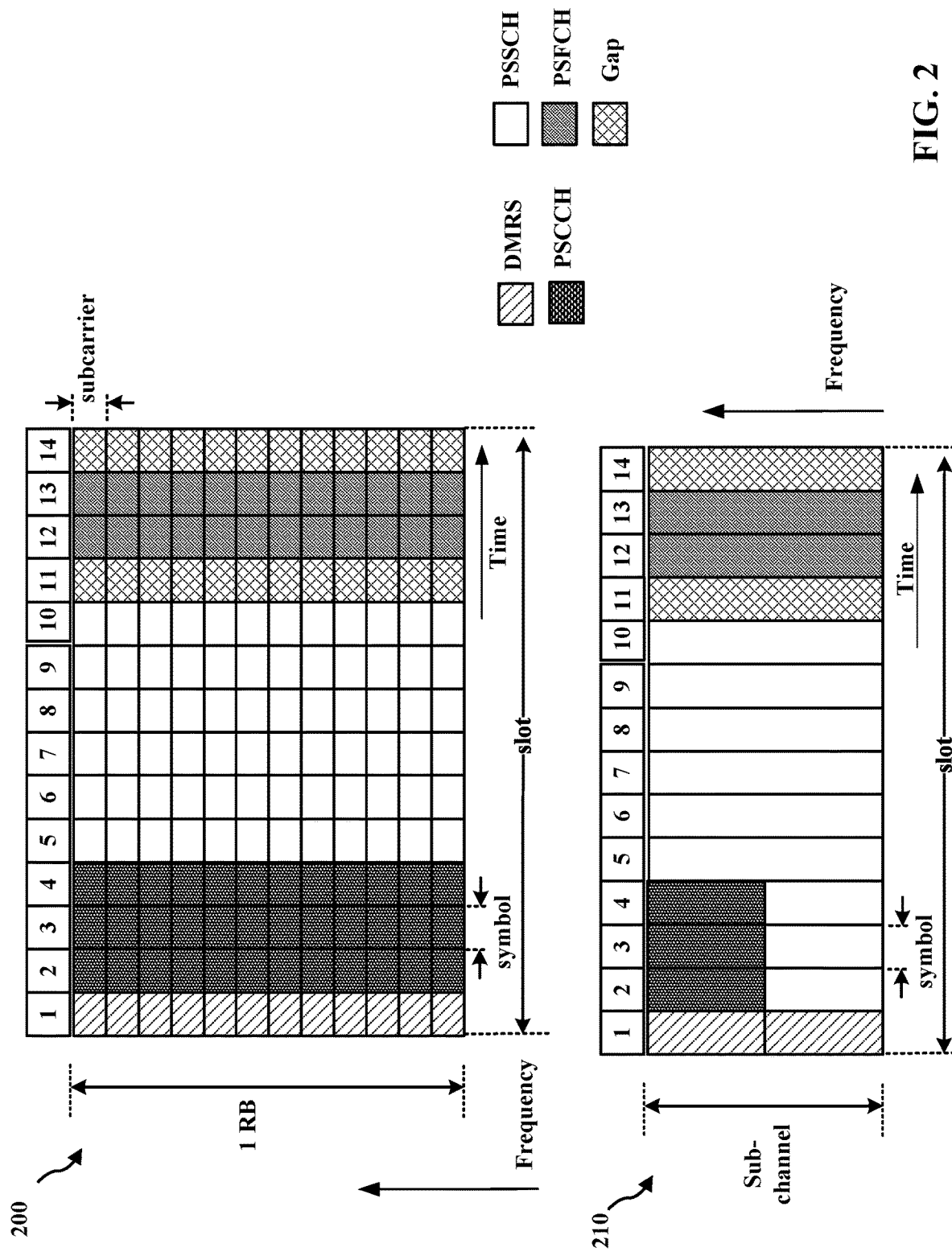
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers may be dedicated for either DL or UL, or may be time division duplexed (TDD) in which for a particular set of subcarriers (carrier system bandwidth), subframes within the set of subcarriers may be dedicated for both DL and UL. In the examples provided by FIGS. 3A and 3C, the 5G NR frame structure may be assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe may be based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |

-continued

| μ | SCS $\Delta f = 2^\mu \cdot 15$ [kHz] | Cyclic prefix |
|---|---|---|
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A-3D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS may be used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
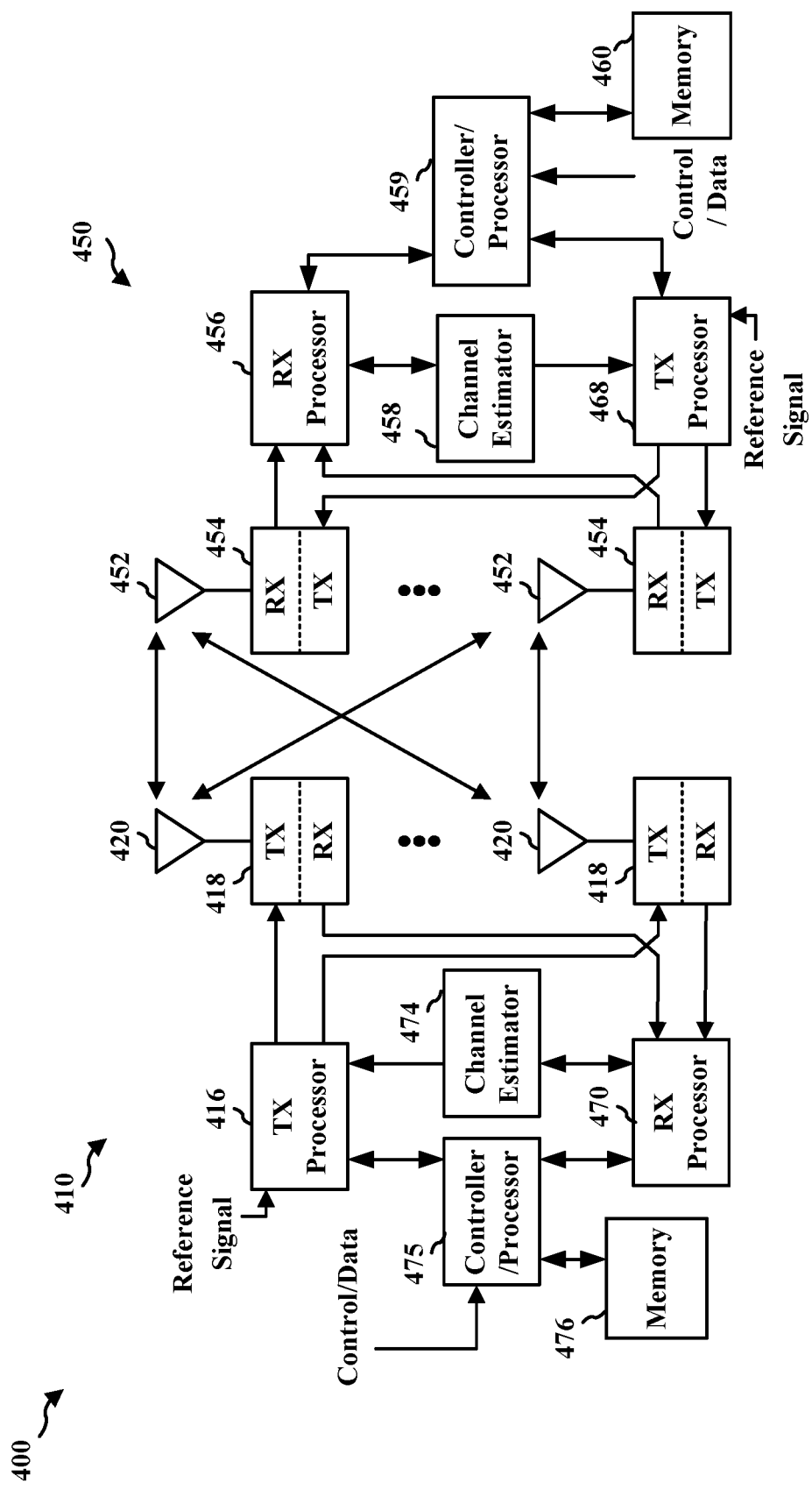
FIG. 4 is a diagram illustrating an example of a first device and a second device involved in wireless communication in accordance with various aspects of the present disclosure.

FIG. 4 is a block diagram 400 of a first wireless communication device 410 in communication with a second wireless communication device 450. The first wireless communication device 410 may be in communication with the second wireless communication device 450 in an access network, or may communicate using sidelink. In some examples, the devices 410 and 450 may communicate based on V2X or other D2D communication. The communication may be based on sidelink using a PC5 interface. The devices 410 and the device 450 may include a UE, an RSU, a base station, etc. Packets may be provided to a controller/processor 475 that implements layer 3 and layer 2 functionality. In some aspects, in the DL, IP packets from the EPC 160 may be provided to a controller/processor 475. The controller/processor 475 implements layer 3 and layer 2 functionality. Layer 3 may include a radio resource control (RRC) layer, and layer 2 may include a packet data convergence protocol (PDCP) layer, a radio link control (RLC) layer, and a medium access control (MAC) layer or may include a service data adaptation protocol (SDAP) layer, a packet data convergence protocol (PDCP) layer, a radio link control (RLC) layer, and a medium access control (MAC) layer.

The controller/processor 475 may provide RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 416 and the receive (Rx) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 416 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418 Tx. Each transmitter 418 Tx may modulate an RF carrier with a respective spatial stream for transmission.

At the device 450, each receiver 454 Rx may receive a signal through its respective antenna 452. Each receiver 454 Rx may recover information modulated onto an RF carrier and may provide the information to the receive (Rx) processor 456. The Tx processor 468 and the Rx processor 456 may implement layer 1 functionality associated with various signal processing functions. The Rx processor 456 may perform spatial processing on the information to recover any spatial streams destined for the device 450. If multiple spatial streams are destined for the device 450, they may be combined by the Rx processor 456 into a single OFDM symbol stream. The Rx processor 456 may then convert the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 3 and layer 2 functionality.

The controller/processor 459 may be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission (e.g. sidelink, DL, UL) by device 410, the controller/processor 459 may provide RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the Tx processor 468 to select the appropriate coding and modulation schemes, and to facilitate spatial processing. The spatial streams generated by the Tx processor 468 may be provided to different antenna 452 via separate transmitters 454 Tx. Each transmitter 454 Tx may modulate an RF carrier with a respective spatial stream for transmission.

The transmission (e.g. sidelink, UL) may be processed at the device 410 in a manner similar to that described in connection with the receiver function at the device 450. Each receiver 418 Rx may receive a signal through its respective antenna 420. Each receiver 418 Rx may recover information modulated onto an RF carrier and may provide the information to a Rx processor 470.

The controller/processor 475 may be associated with a memory 476 that stores program codes and data. The memory 476 may be referred to as a computer-readable medium. The controller/processor 475 may provide demultiplexing between transport and logical channels, packet reassembly, deciphering, header decompression, and/or control signal processing to recover IP packets from the device 450, such as in an UL. IP packets from the controller/processor 475 may be provided to the EPC 160. The controller/processor 475 may also be responsible for error detection using an ACK and/or NACK protocol to support HARQ operations.

At least one of the Tx processor 468, the Rx processor 456, and the controller/processor 459 may be configured to perform aspects in connection with the transmission reliability component 198 of FIG. 1, where the device 450 includes a UE. At least one of the Tx processor 468, the Rx processor 456, and the controller/processor 459 may be configured to perform aspects in connection with 199 of FIG. 1 where the device 450 includes a BS.

At least one of the Tx processor 416, the Rx processor 470, and the controller/processor 475 may be configured to perform aspects in connection with 199 of FIG. 1, where the device 410 includes a UE. At least one of the Tx processor 416, the Rx processor 470, and the controller/processor 475 may be configured to perform aspects in connection with 199 of FIG. 1, where the device 410 includes a BS.

Some wireless communication may be exchanged based on sidelink. In some aspects, a mobile device may transmit sidelink communication. The mobile device may be in motion while transmitting the sidelink communication.

The device that exchanges sidelink communication may include one or more antennas and transceivers which may enable communication to be transmitted or received by the device. The device may further support sidelink communication, such as V2X communication. The device may communicate based on aspects of the sidelink slot structure in FIG. 2 or the frame structure described in connection with FIGS. 3A-3D.

Other wireless communication may be based on an access link, such as Uu communication between a base station and a UE.

Some transmissions, such as URLLC transmissions, may be "bursty" (i.e. irregular and clustered together) and may have a short duration. A URLLC transmission may be mini-slot based, which may have less coverage than a slot-based transmission. For example, a mini-slot having 2 OFDM symbols may have $10*\log 10(7)=8.5$ dB less duration than a 14 OFDM symbol slot-based transmission. Such transmissions may also be configured to have high reliability requirements, such as two transmissions per TB with a residual block error rate (BLER) of 1e-5. One way to improve URLLC coverage and reliability for wireless devices, such as cell edge UEs, may be to mitigate and/or reduce interference from neighboring cells. Aspects presented herein identify pairs of devices that communicate with o in overlapping areas to enable wireless devices to reduce interference between one pair of devices and another pair of devices.

Such pairs of wireless devices may include, for example, a BS communicating wirelessly with a UE in an access network. For example, in the access network of FIG. 1, a first BS 180 may have a first coverage area 110 and may be configured to communicate with a first UE 104 using a first communication link 120 and a second BS 180' may have a second coverage area 110' and may be configured to communicate with a second UE 104' using a second communication link 120'. Both the first UE 104 and the second UE 104' may transmit and receive wireless signals within an overlap of the coverage area 110 and the coverage area 110'. Transmissions using the first communication link 120 may interfere with transmissions using the second communication link 120' and vice-versa. Where interference may exist over an area with overlapped beam coverage from two or more BSs, such as BS 102 and BS 180', one or both of the BSs may use a transmission reliability component 199 to coordinate with the other BS to minimize interference with a UE, such as the UE 104 and the UE 104'. For example, the BS 102 may request from the BS 180' via backhaul link 134 a list of UEs that the BS 180' communicates with having overlapped beam coverage with the UE 104. The BS 180' may be configured to provide at least some configuration information for at least one of the UEs in the list of UEs, such as DMRS configuration, scrambling code, PDCCH configuration, and/or CSI-RS configuration. Such information may be used to minimize interference from a transmission originating from an overlapping wireless device, as explained in more detail below.

Figure 5:
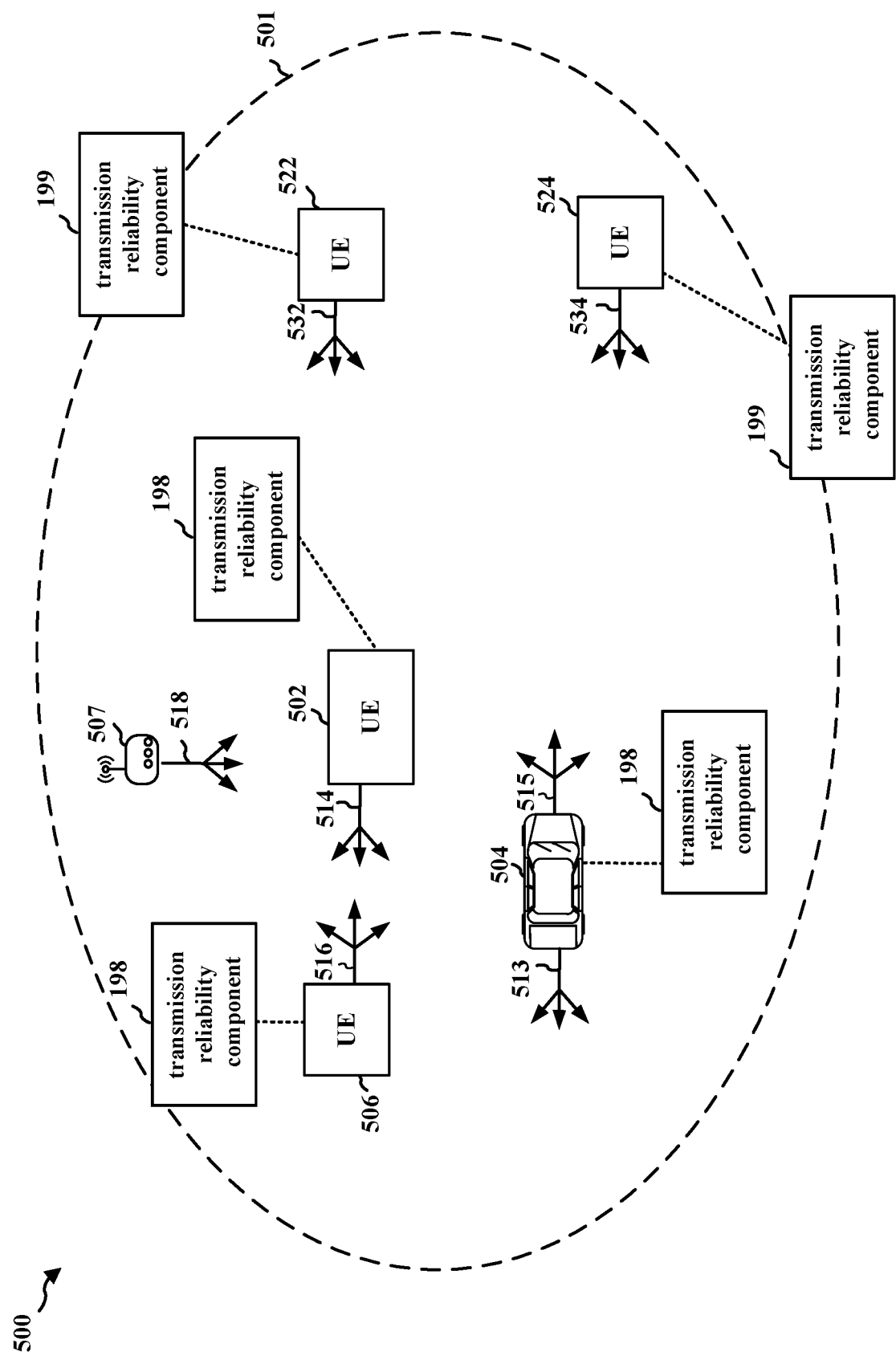
FIG. 5 illustrates example aspects of sidelink communication between devices, in accordance with aspects presented herein.

Such pairs of wireless devices may also include, for example, a UE communicating wirelessly with a UE using sidelink transmissions. For example, in the example 500 of FIG. 5, a UE 502, a UE 504, a UE 506, a UE 522, and a UE 524 may all be configured to communicate with one another via sidelink communication within coverage area 501. The communication may be based on a slot structure including aspects described in connection with FIG. 2. For example, the UE 502 may transmit a transmission 514, e.g., including a control channel (e.g., PSCCH) and/or a corresponding data channel (e.g., PSSCH), that may be received by any of UEs 504, 506, 522, or 524. A control channel may include information (e.g., sidelink control information (SCI)) for decoding the data channel including reservation information, such as information about time and/or frequency resources that may be reserved for the data channel transmission. For example, the SCI may indicate a number of TTIs, as well as the RBs that may be occupied by the data transmission. The SCI may also be used by receiving devices to avoid interference by refraining from transmitting on the reserved resources. The UEs 502, 504, 506, 522, 524 may each be capable of sidelink transmission in addition to sidelink reception. Thus, UEs 504, 506, 522, 524 are illustrated as transmitting transmissions 514, 513, 515, 516, 532, and 534, respectively. The transmissions 514, 513, 515, 516, 532, and 534 may be unicast, broadcast or multicast to nearby devices.

In one aspect, pairs of UEs may be configured to unicast transmissions to each other. In other words, the UE 522 may be configured to unicast a transmission 532 intended for receipt by UE 502, the UE 502 may be configured to unicast a transmission 514 intended for receipt by the UE 522 to form a pair of UEs 522 and 502. Similarly, the UE 524 may be configured to unicast a transmission 534 intended for receipt by the UE 506, and the UE 506 may be configured to unicast a transmission 516 intended for receipt by the UE 524 to form a pair of UEs 524 and 506. Such unicast transmissions may interfere with one another if transmitted simultaneously.

In another aspect, UE 504 may transmit transmissions 513, 515 intended for receipt by other UEs within a coverage area 501 of UE 504, UE 506 may transmit transmission 516 intended for receipt by other UEs within a coverage area 501 of UE 506, UE 502 may transmit transmission 514 intended for receipt by other UEs within a coverage area 501 of UE 502, UE 522 may transmit transmission 532 intended for receipt by other UEs within a coverage area 501 of UE 522, and UE 524 may transmit transmission 534 intended for receipt by other UEs within a coverage area 501 of UE 524. Additionally, or alternatively, RSU 507 may receive communication from and/or transmit transmission 518 to UEs 502, 504, 506, 522, 524. One or more of the UEs 502, 504, 506, 522, 524 or the RSU 507 may include a sidelink reliability component 198 as described in connection with FIG. 1. Such broadcast or multicast transmissions may also interfere with one another if transmitted simultaneously.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE may receive the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

Figure 6:
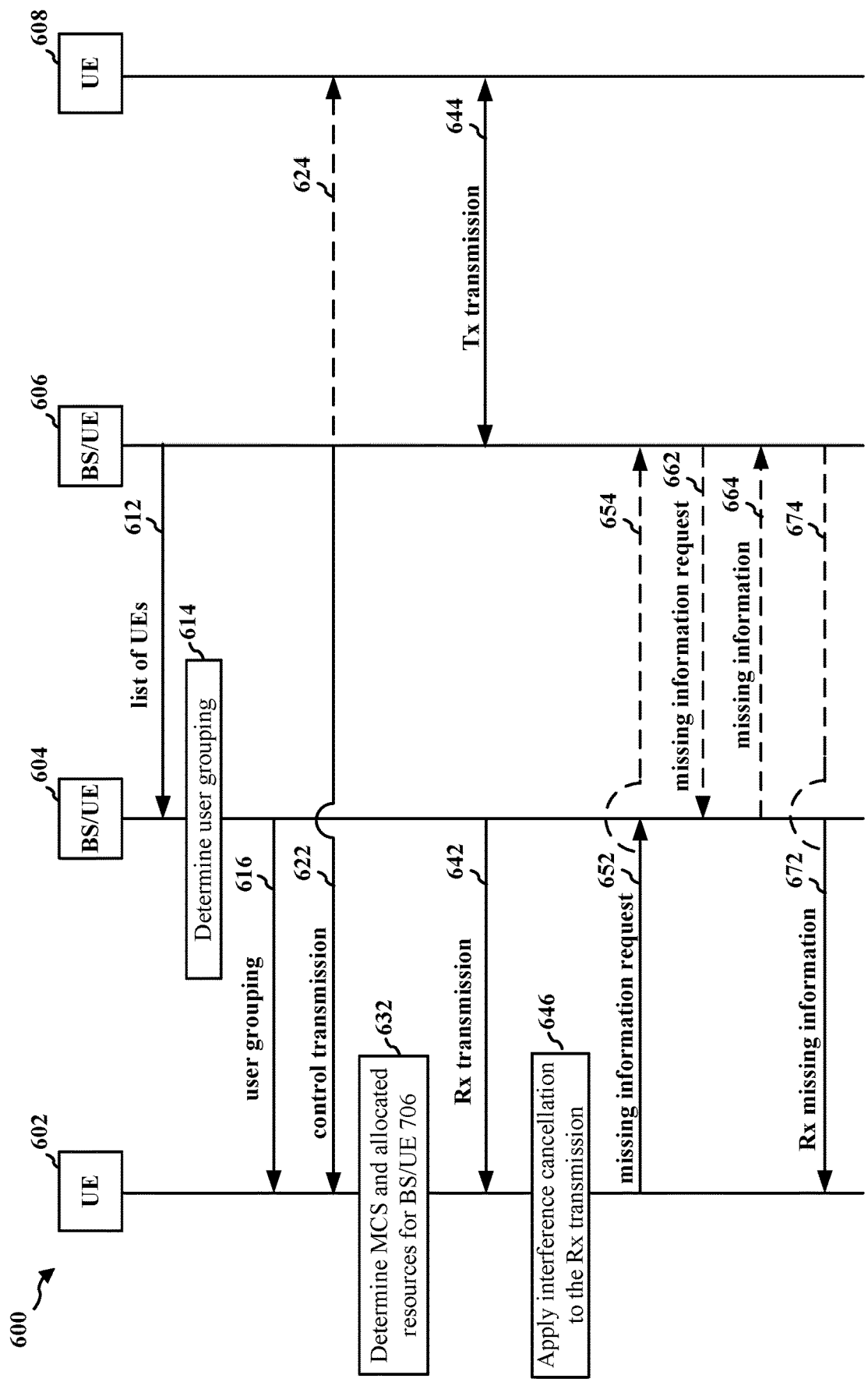
FIG. 6 is a network connection flow diagram that illustrates an example of a first UE and a first wireless device configured to minimize interference with a second UE and a second wireless device, in accordance with various aspects of the present disclosure.

FIG. 6 shows a network connection flow diagram 600 having a UE 602, a wireless device 604, such as a BS or a UE, a wireless device 606, such as a BS or a UE, and a UE 608. The UE 602 and the wireless device 604 may be configured to wirelessly transmit signals to one another, such as Rx transmission 642. The UE 608 and the wireless device 606 may be configured to wirelessly transmit signals to one another, such as Tx transmission 644. The UE 602 may be in a coverage area that overlaps with a coverage area of the wireless device 606 such that a Tx transmission from the wireless device 606 may interfere with an Rx transmission 642 received by the UE 602. The UE 602 may be in a coverage area that overlaps with a coverage area of the UE 608 such that a Tx transmission from the UE 608 may interfere with an Rx transmission 642 received by the UE 602. In other words, a Tx transmission 644 transmitted by either the wireless device 606 or the UE 608 may interfere with the UE 602 successfully receiving the Rx transmission 642.

The wireless device 606 may be configured to transmit a list of UEs 612 to the wireless device 604. For example, where the wireless device 604 and the wireless device 606 include UEs, the wireless device 606 may be configured to transmit the list of UEs 602 via a sidelink transmission. Where the wireless device 604 and the wireless device 606 include BSs, the wireless device 606 may be configured to transmit the list of UEs 602 via an Xn interface or an X2 interface. The list of UEs 612 may include a list of UEs that the wireless device 606 is capable of communicating with wirelessly, and may include the UE 608. The list of UEs 612 may also include, for at least one of the UEs in the list of UEs, a DMRS configuration, a scrambling code, a PDCCH configuration, or a CSI-RS configuration.

The wireless device 604 may use the list of UEs 612 to determine 614 a user grouping of UEs that exist in overlapping coverage areas such that a Tx transmission 644 may interfere with an Rx transmission 642. For example, the wireless device 604 may be configured to group the UE 602 and the UE 608 in the same group to show that, when the wireless device 606 and the UE 608 exchange a Tx transmission 644, the communication results in the highest interference at the UE 602. Such a grouping may be determined based on a location, distance, and/or allocated resources. For example, the wireless device 604 may determine that the UE 608 is located at or within a threshold distance from the wireless device 604, and communicates using a same beam as the UE 602, and thus may place the UE 602 and the UE 608 in a same group. The wireless device 604 may determine a plurality of user groupings that share different attributes, such as a first group having a first location cell and a first set of frequencies, a second group having the first location cell and a second set of frequencies different from the first set of frequencies, and a third group having a second location cell different from the first location cell and the first set of frequencies. The wireless device 604 may determine that a UE, such as the UE 602 or the UE 608, may categorized as belonging to one or more groups. For example, a first UE and a second UE may be placed in a first group, a second UE and a third UE may be placed in a second group, and the first, second, and third UE may be placed in a third group.

The wireless device 604 may be configured to transmit the user grouping 616 to the UE 602, allowing the UE 602 to identify devices that may transmit signals, such as the Tx transmission 644, that may interfere with the Rx transmission 642. The user grouping 616 may identify a set of one or more UEs that may transmit signals that may interfere with the UE 602 successfully receiving a transmission, such as the Rx transmission 642. The user grouping 616 may include one or more sets of interfering devices, such as a set including the UE 602 and the UE 608. For each identified set, the user grouping 616 may also include at least one of a DMRS configuration, a scrambling code, a PDCCH configuration, or a CSI-RS configuration, each of which may allow the UE 602 to monitor communications of a potentially interfering wireless device.

For example, in response to being assigned as a partner to the UE 608, the UE 602 may be configured to monitor at least some communications, such as RRC/DCI communications, between the UE 608 and the wireless device 606. The UE 602 may be configured to receive one or more control transmissions 622 from the wireless device 606, and/or control transmissions 624 from the UE 608. The control transmissions 622, 624, from the device 606 may include, for example, an MCS, an RRC message, a DCI message, and/or allocated resources for the wireless device and/or the UE 608. By decoding a DCI from a control transmission 622, 624, the UE 602 may determine 632 an MCS and/or resource allocations used for the UE 608 and/or the wireless device 606. To assist the UE 602 in decoding a DCI message, the wireless device 606 may be configured to use a DCI that is common to both the UE 602 and the UE 608, allowing both the UE 602 and the UE 608 to communicate with the wireless device 606 using the same DCI. Such a configuration also allows both the UE 602 and the UE 608 to decode DCI sent from the wireless device 606 to the other UE. Additionally, or alternatively, the UE 602 may be configured to use information about the UE 608 obtained from the user grouping 616 (e.g. a scrambling ID of the UE 608, a DMRS configuration of the UE 608) to eavesdrop on DCI transmitted between the wireless device 606 and the UE 608 and decode the DCI. Scrambling code coordination between the wireless device 604 and the wireless device 606 may be feasible via an Xn interface for NR BSs or via an X2 interface for LTE BSs, or via a direct communication, such as a control transmission 622 from the wireless device 606 to the UE 602 or a control transmission 624 from the UE 608 to the UE 602. The control transmission 624 may be transmitted via a sidelink transmission.

When the Tx transmission 644 overlaps with the Rx transmission 642, the Tx transmission 644 may interfere with one or more parts of the Tx transmission 642. The UE 602 may apply 646 interference cancellation to the Rx transmission 642 on any REs or RBs having interference. The interference cancellation may be applied based on gleaned information about the communications between the wireless device 606 and the UE 608, such as the MCS, the scrambling IDs, and/or allocated resources.

Even after applying 646 interference cancellation to the Rx transmission 642, one or more portions of the Rx transmission 642 may fail to be received by the UE 602 (i.e. missing information), such as an RE or an RB of a transmission. The UE 602 may transmit a missing information request 652 to the wireless device 604 to retrieve portions of the Rx transmission 642 that were not successfully received by the UE 602. In response, the wireless device 604 may be configured to retransmit the requested Rx missing information 672 to the UE 602. The requested missing information 672 may be a retransmission of the entire Rx transmission 642. Several Rx missing information 672 messages may be transmitted, each containing a portion of requested missing information.

Additionally, or alternatively, the UE 602 may transmit a missing information request 654 to the wireless device 606. In response, the wireless device 606 may transmit a missing information request 662 to the wireless device 604 for the missing information from the Rx transmission 642. Such a missing information request 662 may be transmitted from the wireless device 604 to the wireless device 606, for example, via a sidelink transmission, an Xn interface, or an X2 interface. In response, the wireless device 604 may transmit the missing information 664 to the wireless device 606. In response, the wireless device 606 may transmit the Rx missing information 674 to the UE 602. By requesting the missing information from the wireless device 606 instead of the wireless device 604, the UE 602 may prevent another Tx transmission 644 from interfering with receiving the Rx missing information 672.

As described, the transmissions and the functions of the wireless device 604 may also be configured for wireless device 606 and vice versa, and the transmissions and the functions of the UE 602 may also be configured for the UE 608. For example, the wireless device 604 may be configured to transmit a list of UEs that the wireless device 604 communicates with to the wireless device 606, and the wireless device 606 may be configured to determine a user grouping based on the received list of UEs. In another aspect, the UE 608 may be configured to receive a control transmission from the UE 602 or the wireless device 604 to determine MCS and allocated resources for the wireless device 604. Such a configuration may allow the UE 608 to apply interface cancellation to Rx transmissions it receives in addition to the UE 602.

Figure 7:
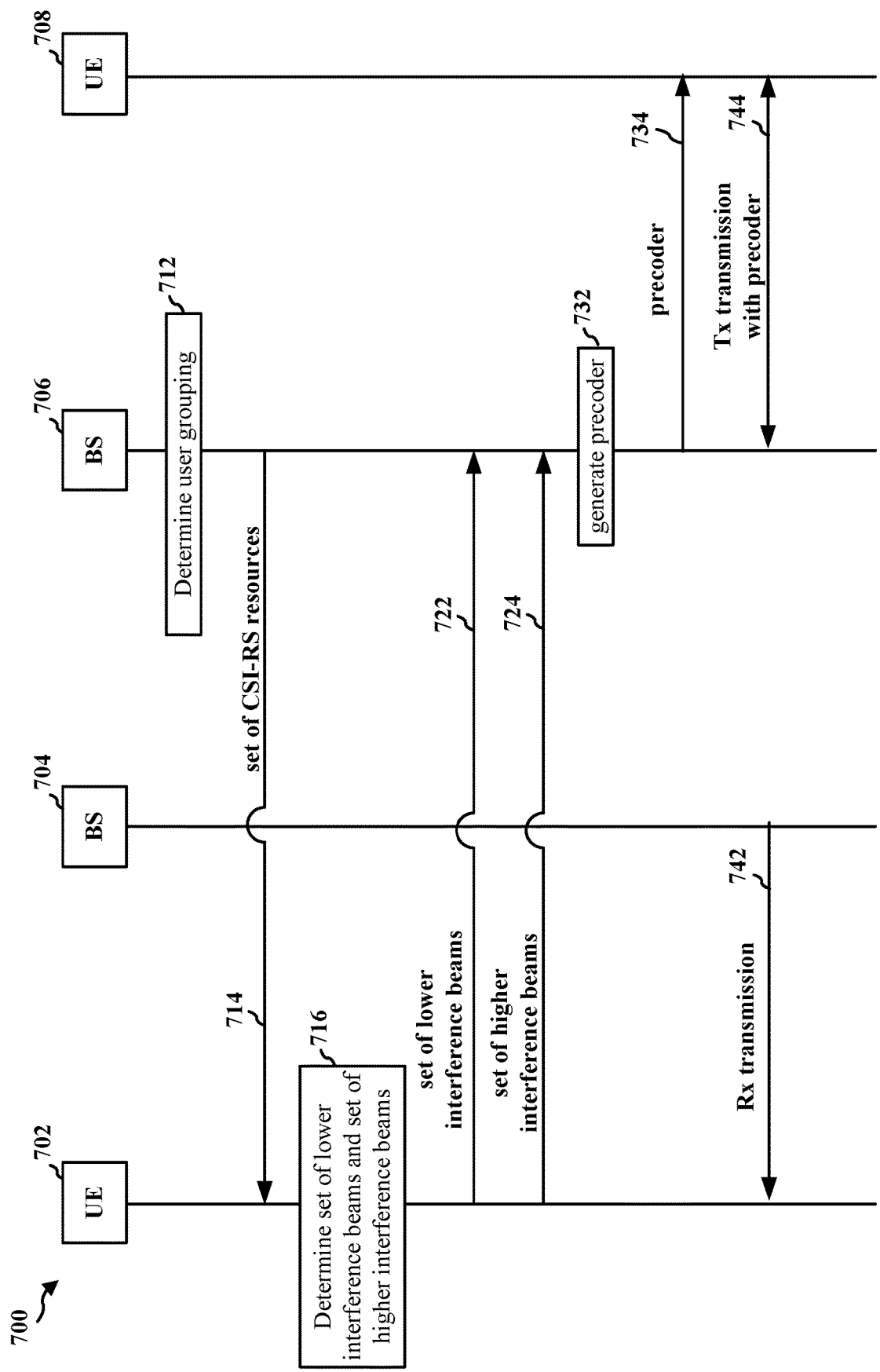
FIG. 7 is a network connection flow diagram that illustrates an example of a first UE and a first BS configured to minimize interference with a second UE and a second BS, in accordance with various aspects of the present disclosure.

FIG. 7 shows a network connection flow diagram 700 having a UE 702, a BS 704, a BS 706, and a UE 708. The UE 702 and the BS 704 may be configured to wirelessly transmit signals to one another, such as Rx transmission 742. The UE 708 and the BS 706 may be configured to wirelessly transmit signals to one another, such as Tx transmission 744. The UE 702 may be in a coverage area that overlaps with a coverage area of the BS 706 such that a Tx transmission 744 from the BS 706 may interfere with an Rx transmission 742 received by the UE 702. The UE 702 may be in a coverage area that overlaps with a coverage area of the UE 708 such that a Tx transmission from the UE 708 may interfere with an Rx transmission 742 received by the UE 702. In other words, a Tx transmission 744 transmitted by either the BS 706 or the UE 708 may interfere with the UE 702 successfully receiving the Rx transmission 742.

The UE 702, BS 704, BS 706, and UE 708 of FIG. 7 may be configured to perform the same or similar functions as the UE 602, wireless device 604, wireless device 606, and UE 608 of FIG. 6, respectively, such as transmitting a list of UEs between the BS 706 and the BS 704, or determine a user grouping based on such a list. Thus, the BS 706 may determine 712 a user grouping for a set of UEs whose transmissions may interfere with one another, such as a Tx transmission 744 from the UE 708 and the Rx transmission 742 to the UE 702. In response, the BS 706 may be configured to transmit a set of CSI-RS resources 714 to the UE 702 to determine 716 a set of lower interference beams and a set of higher interference beams that may interfere with an Rx transmission 742 transmitted to the UE 702. In other words, the UE 702 may determine the best and worst beams transmitted between the BS 706 and the UE 708 which may produce interference at or below a threshold value (i.e. set of lower interference beams), or at and above a threshold value (i.e. set of higher interference beams), respectively. The UE 702 may be configured to transmit the set of lower interference beams 722 to the BS 706. Additionally, or alternatively, the UE 702 may be configured to transmit the set of higher interference beams 724 to the BS 706.

The BS 706 may be configured to use this information, along with information about the UE 708, to reduce interference at the UE 702. For example, the BS 706 may null interference from the BS 706 to the UE 702 by using a low interference beam that does not interfere with any Rx transmissions 742 received by the UE 702. Such a design may null interference from the BS 706 on resources (i.e. REs and RBs of the Rx transmission 742) where both the BS 704 and the BS 706 may use to communicate with the UE 702 and the UE 708, respectively. Additionally, or alternatively, the BS 706 may generate 732 a precoder that reduces interference at the UE 702, for example by restricting use of one or more elements of a transmission panel when transmitting the Tx transmission 744 to the UE 708. The BS 706 may transmit at least some of the generated precoder 734 to the UE 708 to reduce interference to the UE 702. The BS 706 and/or the UE 708 may then use the precoder when transmitting the Tx transmission 744 to reduce interference to the UE 702. When the Tx transmission 744 with the precoder is transmitted during a same time window that the UE 702 receives the Rx transmission 742, interference may be reduced due to use of the generated precoder.

Figure 8:
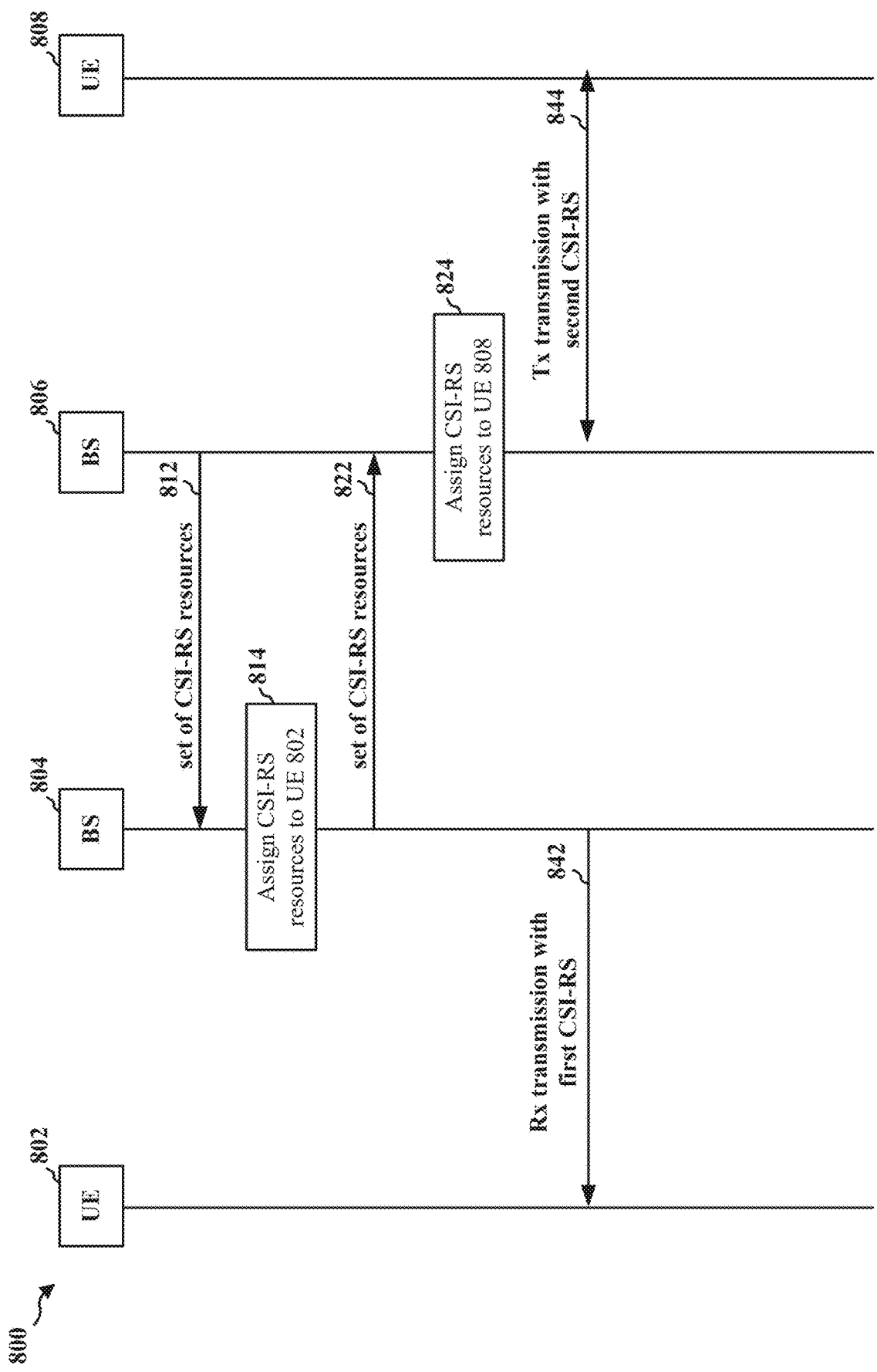
FIG. 8 is a network connection flow diagram that illustrates an example of another first UE and another first BS configured to minimize interference with another second UE and another second BS, in accordance with various aspects of the present disclosure.

FIG. 8 shows a network connection flow diagram 800 having a UE 802, a BS 804, a BS 806, and a UE 808. Similar to the UE 702, BS 704, BS 706, and UE 708 of FIG. 7 and the UE 602, wireless device 604, wireless device 606, and the UE 608 of FIG. 8, respectively, a Tx transmission 844 transmitted by either the BS 806 or the UE 808 may interfere with the UE 802 successfully receiving the Rx transmission 842. The UE 802, BS 804, BS 806, and UE 808 of FIG. 8 may be configured to perform the same or similar functions as the UE 602, wireless device 604, wireless device 606, and UE 608 of FIG. 6, respectively, such as transmitting a list of UEs between the BS 806 and the BS 804, or determining a user grouping based on such a list. Likewise, the UE 802, BS 804, BS 806, and UE 808 of FIG. 8 may be configured to perform the same or similar functions as the UE 702, BS 704, BS 706, and UE 708 of FIG. 7, such as transmitting a set of lower interference beams and a set of higher interference beams from the UE 802 to the BS 806, or using a precoder to transmit the Tx transmission 844.

The BS 806 may be configured to transmit a set of CSI-RS resources 812 to the BS 804. The CSI-RS resources may include possible resources that may be allocated to the UE 808. The CSI-RS resources may be provided to the BS 804 before the BS 806 schedules any resources to the UE 808, allowing for the BS 804 to restrict use of resources allocated to the UE 808 at a later time period. In response to receiving the set of CSI RS resources 812 from the BS 806, the BS 804 may be configured to assign 814 at least one of the CSI-RS resources to the UE 802. The BS 804 may then transmit a set of remaining CSI-RS resources 822 to the BS 806. In response, the BS 806 may then assign 824 one of the remaining CSI-RS resources to UE 808. By allocating a potential CSI-RS resource to the UE 802 before allocating a CSI-RS resource to the UE 808, the BS 806 reduces the likelihood of interference between the Tx transmission 844 and the Rx transmission 842. The BS 804 may transmit an Rx transmission 842 to the UE 802 using a first CSI-RS resource while the BS 806 and the UE 808 may transmit a Tx transmission 844 using a second CSI-RS resource different from the first CSI-RS resource.

Figure 9:
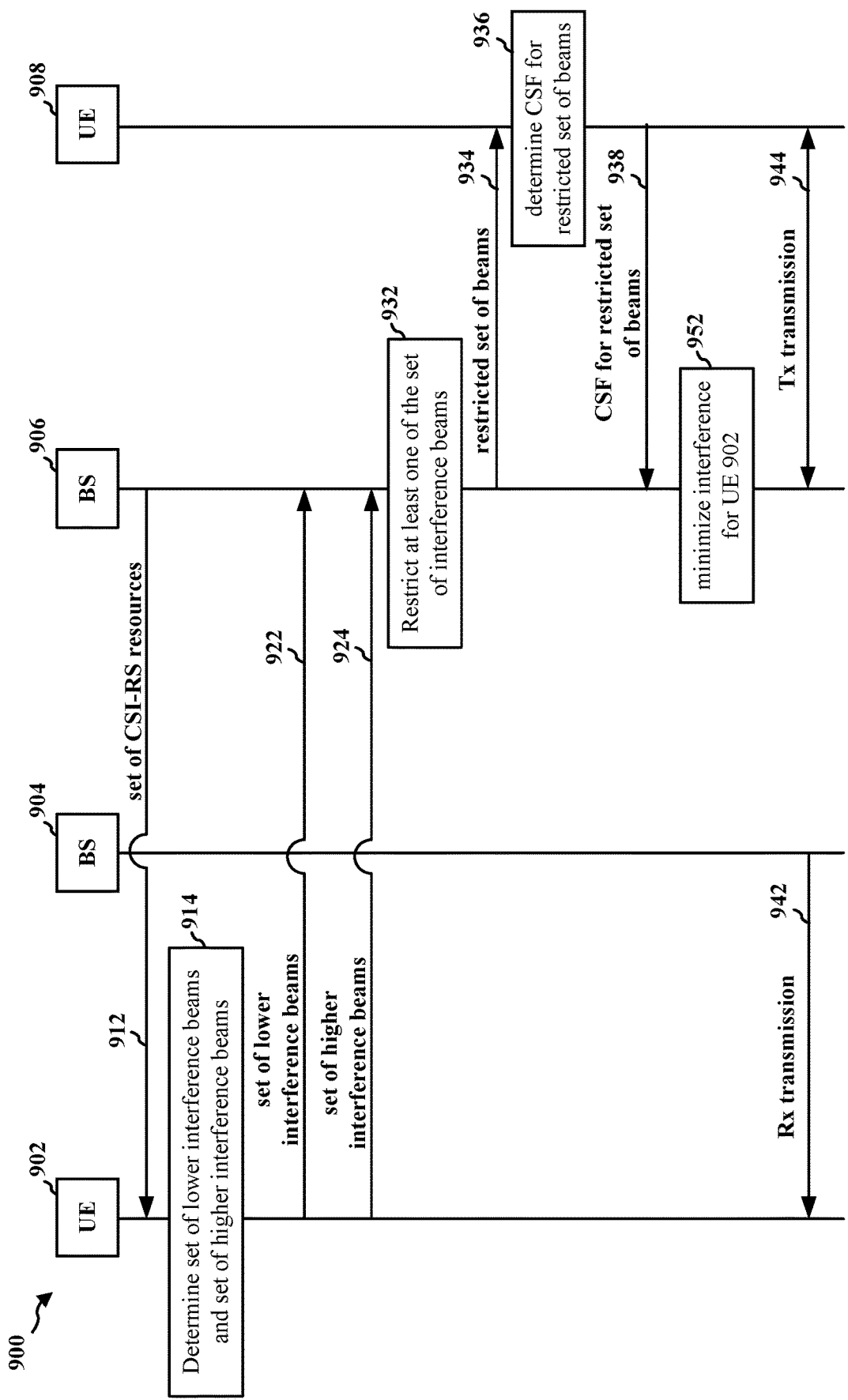
FIG. 9 is a network connection flow diagram that illustrates an example of yet another first UE and yet another first BS configured to minimize interference with yet another second UE and yet another second BS, in accordance with various aspects of the present disclosure.

FIG. 9 shows a network connection flow diagram 900 having a UE 902, a BS 904, a BS 906, and a UE 908. Similar to the UE 802, BS 804, BS 806, and UE 808 of FIG. 8, and the UE 702, BS 704, BS 706, and UE 708 of FIG. 7 and the UE 602, wireless device 604, wireless device 606, and the UE 608 of FIG. 8, respectively, a Tx transmission 944 transmitted by either the BS 906 or the UE 908 may interfere with the UE 902 successfully receiving the Rx transmission 942 from the BS 904. The UE 902, BS 904, BS 906, and UE 908 of FIG. 9 may be configured to perform the same or similar functions as the UE 602, wireless device 604, wireless device 606, and UE 608 of FIG. 6, respectively, such as transmitting a list of UEs between the BS 906 and the BS 904, or determining a user grouping based on such a list. Likewise, the UE 902, BS 904, BS 906, and UE 908 of FIG. 9 may be configured to perform the same or similar functions as the UE 702, BS 704, BS 706, and UE 708 of FIG. 7, such as using a generated precoder to transmit the Tx transmission 944. Similarly, the UE 902, BS 904, BS 906, and UE 908 of FIG. 9 may be configured to perform the same or similar functions as the UE 802, BS 804, BS 806, and UE 808 of FIG. 8, such as assigning CSI-RS resources to UE 902 before assigning CSI-RS resources to UE 908.

The BS 906 may be configured to transmit a set of CSI-RS resources 912 to the UE 902 to determine 914 a set of lower interference beams and a set of higher interference beams that may interfere with an Rx transmission 942 transmitted to the UE 902. In other words, the UE 902 may determine the best and worst beams transmitted between the BS 906 and the UE 908 which may produce interference at or below a threshold value (i.e. set of lower interference beams), or at and above a threshold value (i.e. set of higher interference beams), respectively. The UE 902 may be configured to transmit the set of lower interference beams 922 to the BS 906. Additionally, or alternatively, the UE 902 may be configured to transmit the set of higher interference beams 924 to the BS 906.

The BS 906 may be configured to use this information, along with information about the UE 908, to reduce interference at the UE 902. For example, the BS 906 may be configured to restrict 932 at least one of a set of interference beams from being used by the BS 906 or the UE 908. The BS 906 may restrict a beam search for the UE 908 to avoid interference on the UE 902 based on the beams indicated by the UE 902, such as the set of lower interference beams 922 and/or the set of higher interference beams 924. The BS 906 may be configured to use, for example, i11, i12, and/or i2 restriction for type 1 and type 2 codebooks, such as channel state feedback (CSF) precoding. For example, where the BS 906 may have a two-dimensional panel having a width of N1 and a height of N2, the BS 906 may be configured to generate a DFT codebook with an oversampling rate 01 for a first direction and an oversampling rate 02 for a second direction. The BS 906 may then use the DFT codebook (i.e. matrix) to select an item (e.g. a beam, a direction) from the matrix of the two-dimensional panel as a potential precoder and apply the selected item to the antenna elements of the BS 906 to restrict the use of columns that may interfere with the Rx transmission 942 of the UE 902.

The BS 906 may be configured to transmit the restricted set of beams 934 to the UE 908. In response, the UE 908 may be configured to determine 936 CSF for the received restricted set of beams. For example, the UE 908 may be configured to search for optimal PMI and beams from the available beams of the restricted set of beams 934. The UE 908 may be configured to transmit the CSF for the restricted set of beams 938 to the BS 906.

In response, the BS 906 may be configured to use the collected information to minimize 952 interference at the UE 902. For example, the BS 906 may be configured to use the received CSF data to select an optimal performance beam for the UE 908 that does not interfere with any of the Rx transmissions 942 transmitted to the UE 902. The BS 906 and the UE 908 may use that optimal performance beam to transmit the Tx transmission 944 without interfering with the Rx transmission 942 received by the UE 902. Additionally, or alternatively, the BS 906 may determine service and delay tolerances of the UE 902 services and the UE 908 services based on the determined CSF data, and may reduce or restrict a rank of the UE 908 within its service and delay tolerance levels to reduce interference at the UE 902.

Figure 10:
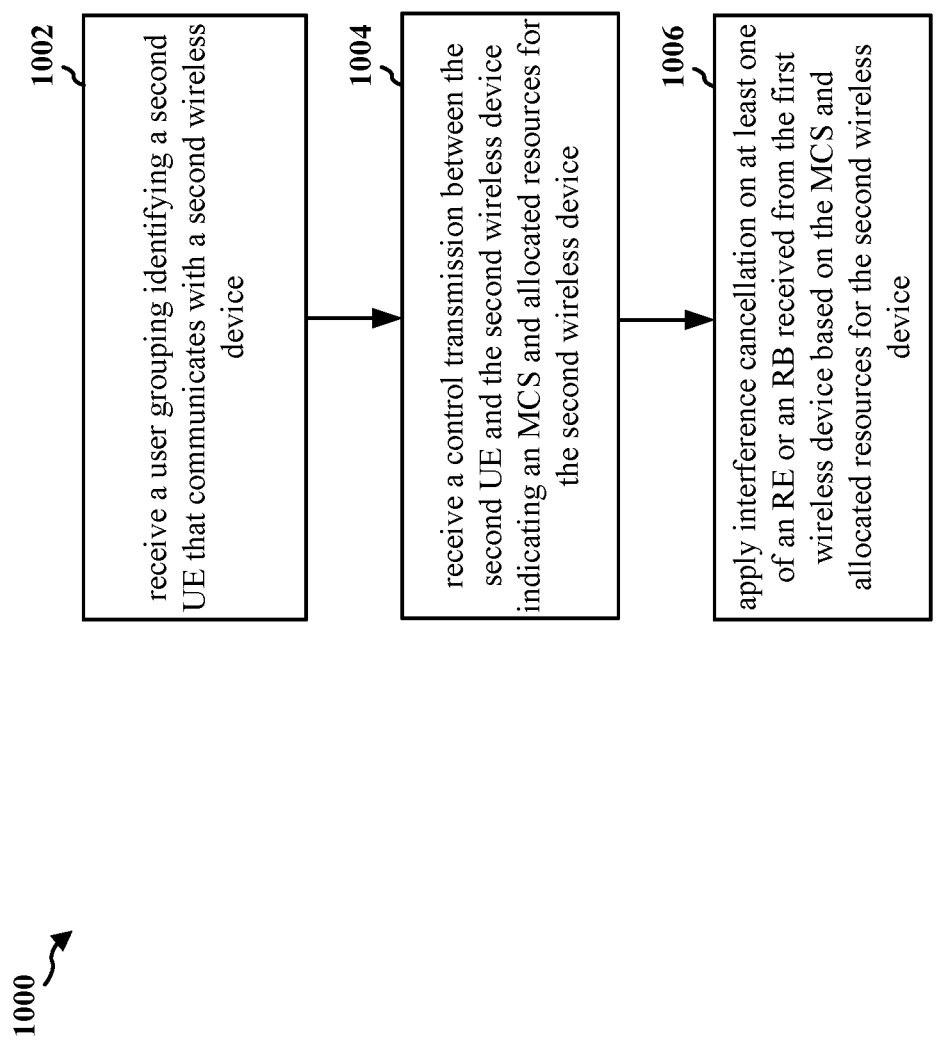
FIG. 10 is a flowchart of a method of wireless communication, in accordance with various aspects of the present disclosure.

FIG. 10 shows a flowchart 1000 of a method of wireless communication. The method may be performed by a UE (e.g., the UE 104, wireless communication device 410, UE 502, UE 602, UE 702, UE 802, or UE 902).

At 1002, a first UE may receive a user grouping identifying a second UE that communicates with a second wireless device. For example, the UE 602 in FIG. 6 may receive a user grouping 616 from the wireless device 604, which may be a BS or another UE. Further, 1002 may be performed by the transmission reliability component 198 in FIG. 1, the transmission reliability component 198 in FIG. 5, the transmission reliability component 1440 in FIG. 14, or the transmission reliability component 1540 in FIG. 15.

At 1004, the first UE may receive a control transmission between the second UE and the second wireless device indicating an MCS and allocated resources for the second wireless device. For example, the UE 602 in FIG. 6 may receive a control transmission 622 from the wireless device 606 or a control transmission 624 from the UE 608 that indicates an MCS and allocated resources for the wireless device 606. Further, 1004 may be performed by the transmission reliability component 198 in FIG. 1, the transmission reliability component 198 in FIG. 5, the transmission reliability component 1440 in FIG. 14, or the transmission reliability component 1540 in FIG. 15.

At 1006, the first UE may apply interference cancellation on at least one of an RE or an RB received from the first wireless device based on the MCS and allocated resources for the second wireless device. For example, the UE 602 in FIG. 6 may apply 646 interference cancellation to an RE and/or an RB of the Rx transmission 642 received from the wireless device 604 based on the MCS and allocated resources for the wireless device 606. Further, 1006 may be performed by the transmission reliability component 198 in FIG. 1, the transmission reliability component 198 in FIG. 5, the transmission reliability component 1440 in FIG. 14, or the transmission reliability component 1540 in FIG. 15.

Figure 11:
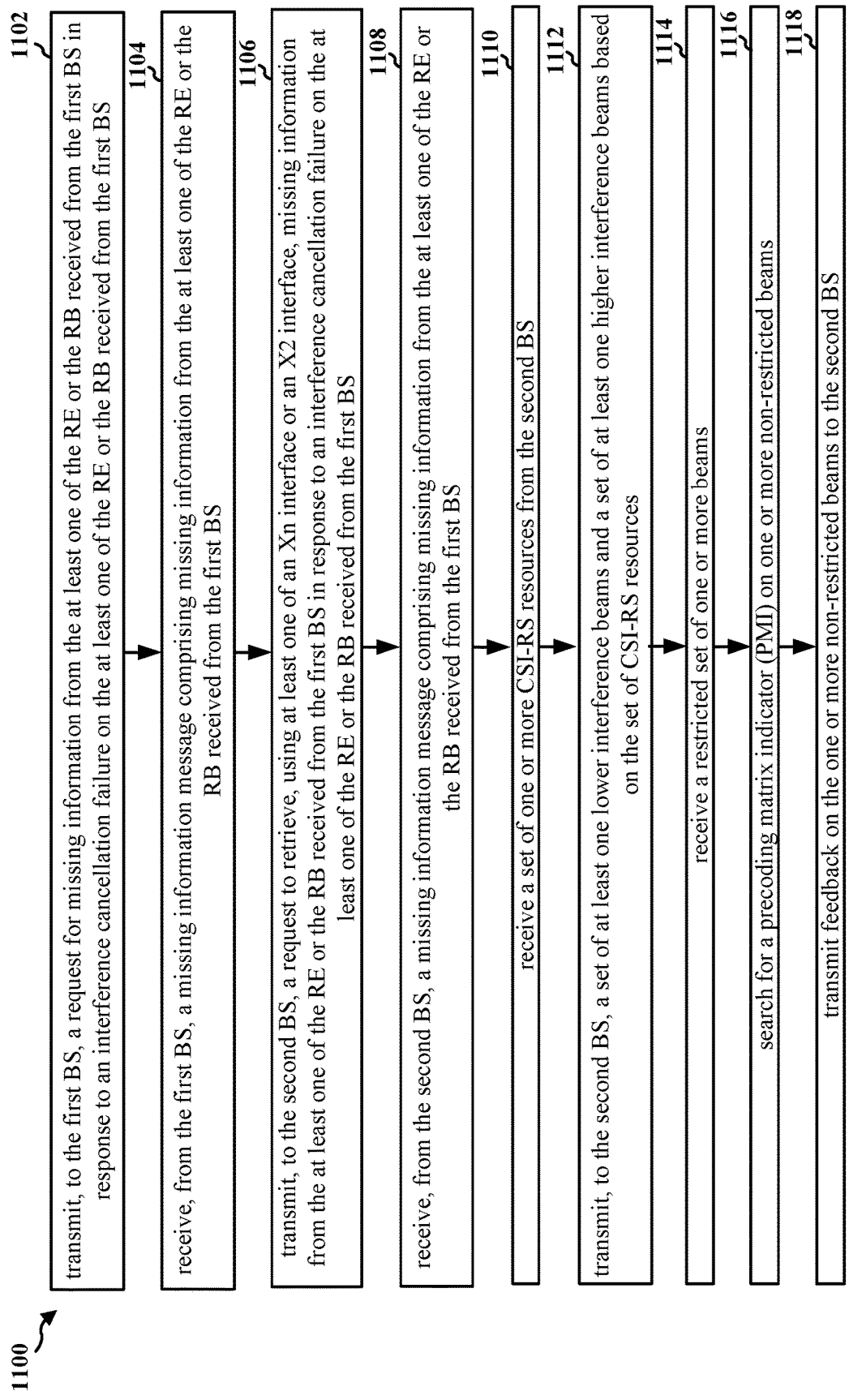
FIG. 11 is another flowchart of a method of wireless communication, in accordance with various aspects of the present disclosure.

FIG. 11 shows a flowchart 1100 of a method of wireless communication. The method may be performed by a UE (e.g., the UE 104, wireless communication device 410, UE 502, UE 602, UE 702, UE 802, or UE 902).

At 1102, a first UE may transmit, to the first BS, a request for missing information from the at least one of the RE or the RB received from the first BS in response to an interference cancellation failure on the at least one of the RE or the RB received from the first BS. For example, the UE 602 in FIG. 6 may transmit, to the wireless device 604, a missing information request 652 for missing information from at least one of the RE or the RB received from the wireless device 604 in the Rx transmission 642. Such a request may be transmitted in response to an interference cancellation failure on the at least one of the RE or the RB received from the wireless device 604 by the UE 602. Further, 1102 may be performed by the transmission reliability component 198 in FIG. 1, the transmission reliability component 198 in FIG. 5, the transmission reliability component 1440 in FIG. 14, or the transmission reliability component 1540 in FIG. 15.

At 1104, the first UE may receive, from the first BS, a missing information message including missing information from the at least one of the RE or the RB received from the first BS. For example, the UE 602 in FIG. 6 may receive, from the wireless device 604, an Rx missing information 672 message that includes missing information from the at least one of the RE or the RB received from the wireless device 604. Further, 1104 may be performed by the transmission reliability component 198 in FIG. 1, the transmission reliability component 198 in FIG. 5, the transmission reliability component 1440 in FIG. 14, or the transmission reliability component 1540 in FIG. 15.

At 1106, the first UE may transmit, to the second BS, a request to retrieve, using at least one of an Xn interface or an X2 interface, missing information from the at least one of the RE or the RB received from the first BS in response to an interference cancellation failure on the at least one of the RE or the RB received from the first BS. For example, the UE 602 in FIG. 6 may transmit, to the wireless device 606, a missing information request 654 for missing information from at least one of the RE or the RB received from the wireless device 604 in the Rx transmission 642. Such a request may be transmitted in response to an interference cancellation failure on the at least one of the RE or the RB received from the wireless device 604 by the UE 602. Further, 1106 may be performed by the transmission reliability component 198 in FIG. 1, the transmission reliability component 198 in FIG. 5, the transmission reliability component 1440 in FIG. 14, or the transmission reliability component 1540 in FIG. 15.

At 1108, the first UE may receive, from the second BS, a missing information message including missing information from the at least one of the RE or the RB received from the first BS. For example, the UE 602 in FIG. 6 may receive, from the wireless device 606, an Rx missing information 674 message that includes missing information from the at least one of the RE or the RB received from the wireless device 604. Further, 1108 may be performed by the transmission reliability component 198 in FIG. 1, the transmission reliability component 198 in FIG. 5, the transmission reliability component 1440 in FIG. 14, or the transmission reliability component 1540 in FIG. 15.

At 1110, the first UE may receive a set of one or more CSI-RS resources from the second BS. For example, the UE 702 in FIG. 7 may receive, from the BS 706, a set of one or more CSI-RS resources 714 from the BS 706. Further, 1110 may be performed by the transmission reliability component 198 in FIG. 1, the transmission reliability component 198 in FIG. 5, the transmission reliability component 1440 in FIG. 14, or the transmission reliability component 1540 in FIG. 15.

At 1112, the first UE may transmit, to the second BS, a set of at least one lower interference beams and a set of at least one higher interference beams based on the set of CSI-RS resources. For example, the UE 702 in FIG. 7 may transmit, to the BS 706, a set of at least one lower interference beams 722 and a set of at least one higher interference beams 724 based on the set of CSI-RS resources 714. Further, 1112 may be performed by the transmission reliability component 198 in FIG. 1, the transmission reliability component 198 in FIG.

Figure 14:
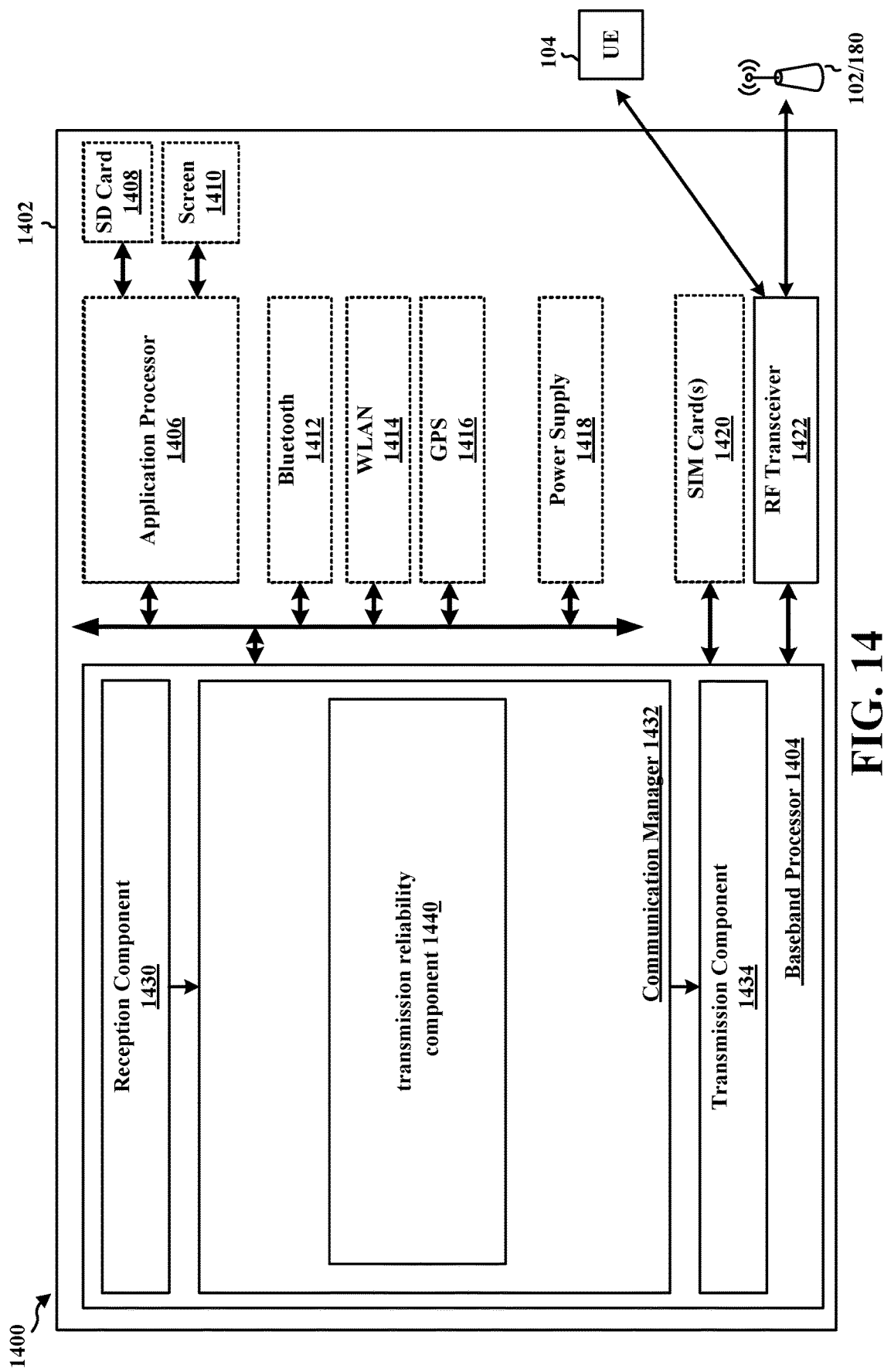
FIG. 14 is a diagram illustrating an example of a hardware implementation for an example apparatus, in accordance with various aspects of the present disclosure.
Figure 15:
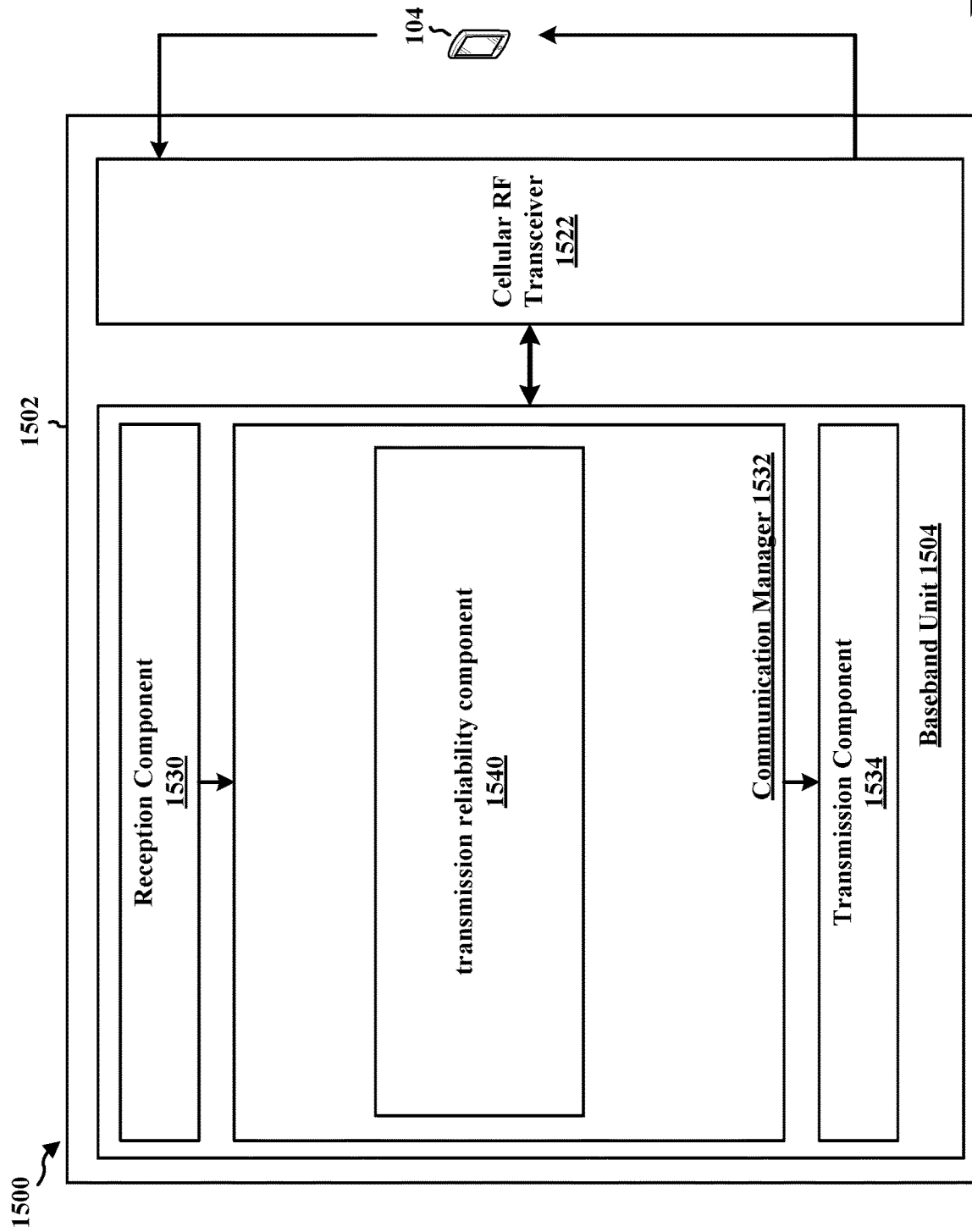
FIG. 15 is a diagram illustrating an example of another hardware implementation for an example apparatus, in accordance with various aspects of the present disclosure.

5, the transmission reliability component 1440 in FIG. 14, or the transmission reliability component 1540 in FIG. 15.

At 1114, the first UE may receive a restricted set of one or more beams. For example, the UE 908 in FIG. 9 may receive a restricted set of beams 934 from the BS 906. Further, 1114 may be performed by the transmission reliability component 198 in FIG. 1, the transmission reliability component 198 in FIG. 5, the transmission reliability component 1440 in FIG. 14, or the transmission reliability component 1540 in FIG. 15.

At 1116, the first UE may search for a PMI on one or more non-restricted beams. For example, the UE 908 in FIG. 9 may determine 936 CSF for the restricted set of beams by searching for a PMI on one or more non-restricted beams of the restricted set of beams 934. Further, 1116 may be performed by the transmission reliability component 198 in FIG. 1, the transmission reliability component 198 in FIG. 5, the transmission reliability component 1440 in FIG. 14, or the transmission reliability component 1540 in FIG. 15.

At 1118, the first UE may transmit feedback on the one or more non-restricted beams to the second BS. For example, the UE 908 in FIG. 9 may transmit a CSF for the restricted set of beams 938 to the BS 906. Further, 1118 may be performed by the transmission reliability component 198 in FIG. 1, the transmission reliability component 198 in FIG. 5, the transmission reliability component 1440 in FIG. 14, or the transmission reliability component 1540 in FIG. 15.

Figure 12:
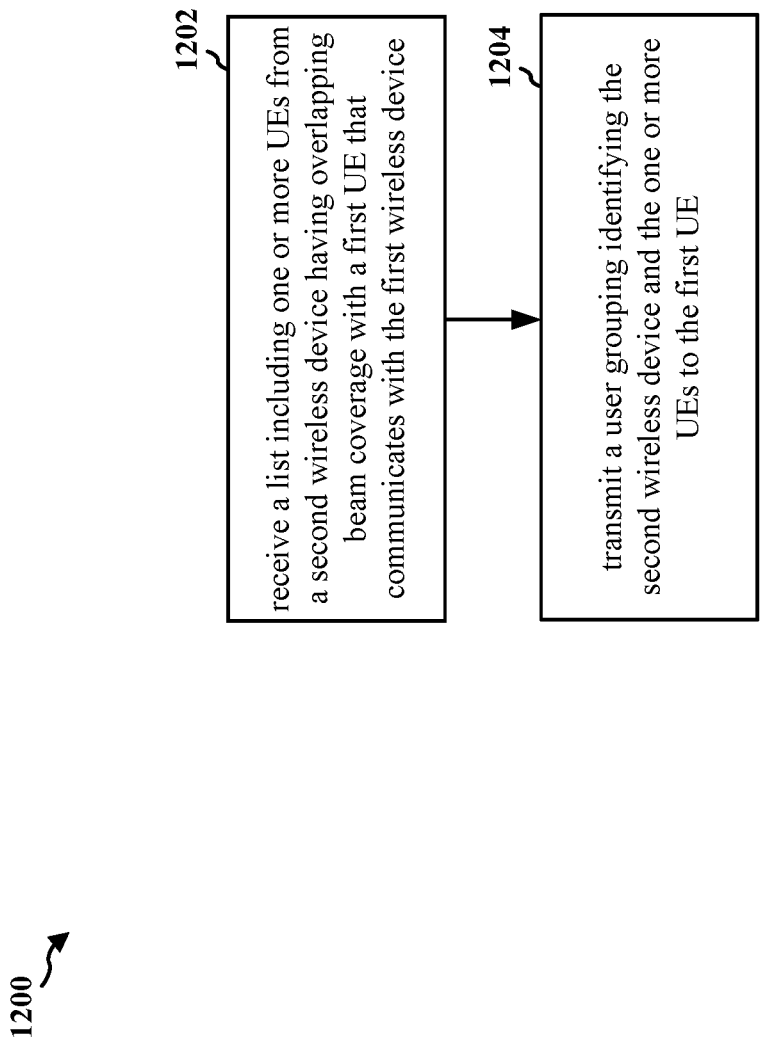
FIG. 12 is another flowchart of a method of wireless communication, in accordance with various aspects of the present disclosure.

FIG. 12 shows a flowchart 1200 of a method of wireless communication. The method may be performed by a wireless device (e.g., the BS 102, BS 180, BS 180' wireless communication device 450, UE 522, UE 524, wireless device 604, wireless device 606, BS 704, BS 706, BS 804, BS 806, BS904, or BS 906).

At 1202, a first wireless device may receive a list including one or more UEs from a second wireless device having overlapping beam coverage with a first UE that communicates with the first wireless device. For example, the wireless device 604 in FIG. 6 may receive a list of UEs 614 including one or more UEs from the wireless device 604 having overlapping beam coverage with the UE 602 that communicates with the wireless device 604. Further, 1202 may be performed by the transmission reliability component 199 in FIG. 1, the transmission reliability component 198 in FIG. 5, the transmission reliability component 1440 in FIG. 14, or the transmission reliability component 1540 in FIG. 15.

At 1204, the first wireless device may transmit a user grouping identifying the second wireless device and the one or more UEs to the first UE. For example, the wireless device 604 in FIG. 6 may transmit a user grouping 616 to the UE 602 identifying the wireless device 606 and the one or more UEs to the UE 602. Further, 1204 may be performed by the transmission reliability component 199 in FIG. 1, the transmission reliability component 198 in FIG. 5, the transmission reliability component 1440 in FIG. 14, or the transmission reliability component 1540 in FIG. 15.

Figure 13:
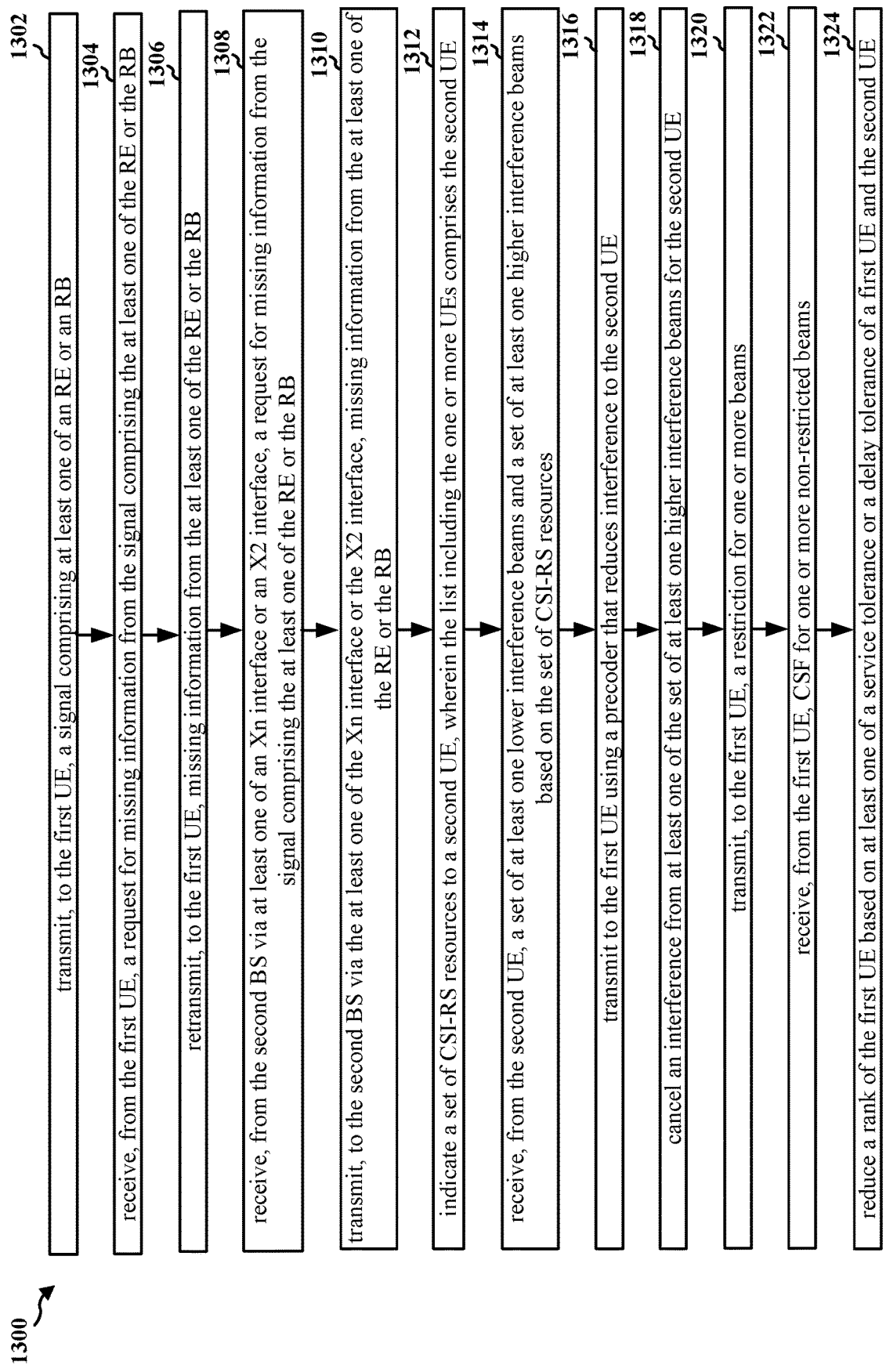
FIG. 13 is another flowchart of a method of wireless communication, in accordance with various aspects of the present disclosure.

FIG. 13 shows a flowchart 1300 of a method of wireless communication. The method may be performed by a wireless device (e.g., the BS 102, BS 180, BS 180' wireless communication device 450, UE 522, UE 524, wireless device 604, wireless device 606, BS 704, BS 706, BS 804, BS 806, BS904, or BS 906).

At 1302, the first wireless device may transmit, to the first UE, a signal including at least one of an RE or an RB. For example, the wireless device 604 in FIG. 6 may transmit to the UE 602, an Rx transmission 642 including at least one of an RE or an RB. Further, 1302 may be performed by the transmission reliability component 199 in FIG. 1, the transmission reliability component 198 in FIG. 5, the transmission reliability component 1440 in FIG. 14, or the transmission reliability component 1540 in FIG. 15.

At 1304, the first wireless device may receive, from the first UE, a request for missing information from the signal including the at least one of the RE or the RB. For example, the wireless device 604 in FIG. 6 may receive, from the UE 602, a missing information request 652 from the Rx transmission 642 including the at least one of the RE or the RB. Further, 1304 may be performed by the transmission reliability component 199 in FIG. 1, the transmission reliability component 198 in FIG. 5, the transmission reliability component 1440 in FIG. 14, or the transmission reliability component 1540 in FIG. 15.

At 1306, the first wireless device may retransmit, to the first UE, missing information from the at least one of the RE or the RB. For example, the wireless device 604 in FIG. 6 may retransmit the Rx missing information 672 to the UE 602, which contains missing information from the at least one of the RE or the RB. Further, 1306 may be performed by the transmission reliability component 199 in FIG. 1, the transmission reliability component 198 in FIG. 5, the transmission reliability component 1440 in FIG. 14, or the transmission reliability component 1540 in FIG. 15.

At 1308, the first wireless device may receive, from the second BS via at least one of an Xn interface or an X2 interface, a request for missing information from the signal including the at least one of the RE or the RB. For example, the wireless device 604 in FIG. 6 may receive, from the wireless device 606 via at least one of an Xn interface or an X2 interface, a missing information request 662 from the Rx transmission 642 including the at least one of the RE or the RB. Further, 1308 may be performed by the transmission reliability component 199 in FIG. 1, the transmission reliability component 198 in FIG. 5, the transmission reliability component 1440 in FIG. 14, or the transmission reliability component 1540 in FIG. 15.

At 1310, the first wireless device may transmit, to the second BS via the at least one of the Xn interface or the X2 interface, missing information from the at least one of the RE or the RB. For example, the wireless device 604 in FIG. 6 may transmit, to the wireless device 606 via the at least one of the Xn interface or the X2 interface, missing information 664 from the at least one of the RE or the RB. Further, 1310 may be performed by the transmission reliability component 199 in FIG. 1, the transmission reliability component 198 in FIG. 5, the transmission reliability component 1440 in FIG. 14, or the transmission reliability component 1540 in FIG. 15.

At 1312, the first wireless device may indicate a set of CSI-RS resources to a second UE, where the list including the one or more UEs including the second UE. For example, the BS 706 in FIG. 7 may indicate a set of CSI-RS resources 714 to a UE 702. Further, 1312 may be performed by the transmission reliability component 199 in FIG. 1, the transmission reliability component 198 in FIG. 5, the transmission reliability component 1440 in FIG. 14, or the transmission reliability component 1540 in FIG. 15.

At 1314, the first wireless device may receive, from the second UE, a set of at least one lower interference beams and a set of at least one higher interference beams based on the set of CSI-RS resources. For example, the BS 706 in FIG. 7 may receive, from the UE 702, a set of at least one lower interference beams 722 and a set of at least one higher interference beams 724 based on the set of CSI-RS resources 714. Further, 1314 may be performed by the transmission reliability component 199 in FIG. 1, the transmission reliability component 198 in FIG. 5, the transmission reliability component 1440 in FIG. 14, or the transmission reliability component 1540 in FIG. 15.

At 1316, the first wireless device may transmit to the first UE using a precoder that reduces interference to the second UE. For example, the BS 706 in FIG. 7 may transmit the Tx transmission 744 to the UE 708 using the generated precoder that reduces interference to the UE 702. Further, 1316 may be performed by the transmission reliability component 199 in FIG. 1, the transmission reliability component 198 in FIG. 5, the transmission reliability component 1440 in FIG. 14, or the transmission reliability component 1540 in FIG. 15.

At 1318, the first wireless device may cancel an interference from at least one of the set of at least one higher interference beams for the second UE. For example, the BS 906 in FIG. 9 may minimize 952 interference for UE 902 by cancelling an interference from at least one of the set of higher interference beams 924 for the UE 902. Further, 1318 may be performed by the transmission reliability component 199 in FIG. 1, the transmission reliability component 198 in FIG. 5, the transmission reliability component 1440 in FIG. 14, or the transmission reliability component 1540 in FIG. 15.

At 1320, the first wireless device may transmit, to the first UE, a restriction for one or more beams. For example, the BS 906 in FIG. 9 may transmit, to the UE 908, a restricted set of beams 934. Further, 1320 may be performed by the transmission reliability component 199 in FIG. 1, the transmission reliability component 198 in FIG. 5, the transmission reliability component 1440 in FIG. 14, or the transmission reliability component 1540 in FIG. 15.

At 1322, the first wireless device may receive, from the first UE, CSF for one or more non-restricted beams. For example, the BS 906 in FIG. 9 may receive, from the UE 908, CSF for the restricted set of beams 938. Further, 1322 may be performed by the transmission reliability component 199 in FIG. 1, the transmission reliability component 198 in FIG. 5, the transmission reliability component 1440 in FIG. 14, or the transmission reliability component 1540 in FIG. 15.

At 1324, the first wireless device may reduce a rank of the first UE based on at least one of a service tolerance or a delay tolerance of a first UE and the second UE. For example, the BS 906 in FIG. 9 may minimize 952 interference for the UE 902 by reducing a rank of the UE 908 based on at least one of a service tolerance or a delay tolerance of the UE 908 and the UE 902. Further, 1324 may be performed by the transmission reliability component 199 in FIG. 1, the transmission reliability component 198 in FIG. 5, the transmission reliability component 1440 in FIG. 14, or the transmission reliability component 1540 in FIG. 15.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the wireless device 450 and may include the memory 460 and/or at least one of the TX processor 468, the RX processor 456, and the controller/processor 459. In one configuration, the apparatus 1402 may be a modem chip and include just the baseband processor 1404, and in another configuration, the apparatus 1402 may be the entire wireless device (e.g., see device 450 of FIG. 4) and include the additional modules of the apparatus 1402.

The communication manager 1432 may include a component 1440 that is configured to improve transmission reliability of at least one other UE, e.g., as described in connection with step 1006 of FIG. 10.

The apparatus may include additional components that perform each of the blocks of the algorithm in the flowcharts of FIGS. 10-13. As such, each block in the flowcharts of FIGS. 10-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving a user grouping identifying a second UE that communicates with a second wireless device, means for receiving a control transmission between the second UE and the second wireless device indicating an MCS and allocated resources for the second wireless device, means for applying interference cancellation on at least one of an RE or an RB received from the first wireless device based on the MCS and allocated resources for the second wireless device, means for transmitting, to the first BS, a request for missing information from the at least one of the RE or the RB received from the first BS in response to an interference cancellation failure on the at least one of the RE or the RB received from the first BS, means for receiving, from the first BS, a missing information message including missing information from the at least one of the RE or the RB received from the first BS., means for transmitting, to the second BS, a request to retrieve, using at least one of an Xn interface or an X2 interface, missing information from the at least one of the RE or the RB received from the first BS in response to an interference cancellation failure on the at least one of the RE or the RB received from the first BS, means for receiving, from the second BS, a missing information message including missing information from the at least one of the RE or the RB received from the first BS, means for receiving a set of one or more CSI-RS resources from the second BS, means for transmitting, to the second BS, a set of at least one lower interference beams and a set of at least one higher interference beams based on the set of CSI-RS resources, means for receiving a restricted set of one or more beams, and means for searching for a PMI on one or more non-restricted beams, means for transmitting feedback on the one or more non-restricted beams to the second BS. The means may be one or more of the components of the apparatus 1402 configured to perform the functions recited by the means. As described supra, the apparatus 1402 may include the Tx Processor 468, the Rx Processor 456, and the controller/processor 459. As such, in one configuration, the means may be the Tx Processor 468, the Rx Processor 456, and the controller/processor 459 configured to perform the functions recited by the means.

FIG. 15 is a diagram 1500 illustrating an example of a hardware implementation for an apparatus 1502. The apparatus 1502 may be a base station, a component of a base station, or may implement base station functionality. In some aspects, the apparatus 1402 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the wireless device 410 and may include the memory 476 and/or at least one of the TX processor 416, the RX processor 470, and the controller/processor 475.

The communication manager 1532 may include a component 1540 that improves the transmission reliability of receiving at a transmission for at least one UE, e.g., as described in connection with step 1204 of FIG. 12.

The apparatus may include additional components that perform each of the blocks of the algorithm in the flowcharts of FIGS. 10-13. As such, each block in the flowcharts of FIGS. 10-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving a list including one or more UEs from a second wireless device having overlapping beam coverage with a first UE that communicates with the first wireless device, means for transmitting a user grouping identifying the second wireless device and the one or more UEs to the first UE, means for transmitting, to the first UE, a signal including at least one of an RE or an RB, means for receiving, from the first UE, a request for missing information from the signal including the at least one of the RE or the RB, means for retransmitting, to the first UE, missing information from the at least one of the RE or the RB, means for receiving, from the second BS via at least one of an Xn interface or an X2 interface, a request for missing information from the signal including the at least one of the RE or the RB, means for transmitting, to the second BS via the at least one of the Xn interface or the X2 interface, missing information from the at least one of the RE or the RB, means for indicating a set of CSI-RS resources to a second UE, where the list including the one or more UEs includes the second UE, means for receiving, from the second UE, a set of at least one lower interference beams and a set of at least one higher interference beams based on the set of CSI-RS resources, means for transmitting to the first UE using a precoder that reduces interference to the second UE, means for transmitting, to the first UE, a restriction for one or more beams, and means for receiving, from the first UE, CSF for one or more non-restricted beams.

The means may be one or more of the components of the apparatus 1502 configured to perform the functions recited by the means. As described supra, the apparatus 1502 may include the Tx Processor 416, the Rx Processor 470, and the controller/processor 475. As such, in one configuration, the means may be the Tx Processor 416, the Rx Processor 470, and the controller/processor 475 configured to perform the functions recited by the means. It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the terms "some" and "set" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is an apparatus for receiving wireless communication at a first UE from a first wireless device, including a memory and at least one processor coupled to the memory. The memory and the at least one processor may be configured to receive a user grouping identifying a second UE that communicates with a second wireless device. The memory and the at least one processor may be further configured to receive a control transmission between the second UE and the second wireless device indicating an MCS and allocated resources for the second wireless device. The memory and the at least one processor may be further configured to apply interference cancellation on at least one of an RE or an RB received from the first wireless device based on the MCS and allocated resources for the second wireless device.

Aspect 2 is the apparatus of aspect 1, further including a transmitter, where the first wireless device includes a first BS and the second wireless device includes a second BS.

Aspect 3 is the apparatus of aspect 2, where the control transmission includes one or more of an RRC message and a DCI message.

Aspect 4 is the apparatus of aspect 3, where the control transmission includes a common DCI that is common to both the first UE and the second UE.

Aspect 5 is the apparatus of any of aspects 2 to 3, where the first UE uses a scrambling ID of the second UE to decode a DCI message from the second BS to the second UE.

Aspect 6 is the apparatus of any of aspects 2 to 5, where the memory and the at least one processor may be further configured to transmit, to the first BS, a request for missing information from the at least one of the RE or the RB received from the first BS in response to an interference cancellation failure on the at least one of the RE or the RB received from the first BS. The memory and the at least one processor may be further configured to receive, from the first BS, a missing information message including at least a portion of the missing information from the at least one of the RE or the RB received from the first BS.

Aspect 7 is the apparatus of any of aspects 2 to 6, where the memory and the at least one processor may be further configured to transmit, to the second BS, a request to retrieve, using at least one of an Xn interface or an X2 interface, missing information from the at least one of the RE or the RB received from the first BS in response to an interference cancellation failure on the at least one of the RE or the RB received from the first BS. The memory and the at least one processor may be further configured to receive, from the second BS, a missing information message including at least a portion of the missing information from the at least one of the RE or the RB received from the first BS.

Aspect 8 is the apparatus of any of aspects 2 to 6, where the user grouping may be based on an area of overlapped beam coverage from the first BS and the second BS.

Aspect 9 is the apparatus of aspect 8 where the user grouping may identify a set of one or more UEs. The set of one or more UEs may include the first UE and the second UE. For each of the identified set of one or more UEs, the user grouping may further identify at least one of a DMRS configuration, a scrambling code, a PDCCH configuration, or a CSI-RS configuration.

Aspect 10 is the apparatus of any of aspects 2 to 9, where the memory and the at least one processor may be further configured to receive a set of one or more CSI-RS resources from the second BS. The memory and the at least one processor may be further configured to transmit, to the second BS, a set of at least one lower interference beams and a set of at least one higher interference beams based on the set of one or more CSI-RS resources.

Aspect 11 is the apparatus of any of aspects 2 to 10, where the memory and the at least one processor may be further configured to receive a restricted set of one or more beams. The memory and the at least one processor may be further configured to search for a PMI on one or more non-restricted beams. The memory and the at least one processor may be further configured to transmit feedback on the one or more non-restricted beams to the second BS.

Aspect 12 is the apparatus of aspect 1, further including a transmitter, where the first wireless device includes a third UE and where the second wireless device includes a fourth UE.

Aspect 13 is the apparatus of aspect 12, where the control transmission includes a sidelink transmission.

Aspect 14 is an apparatus for wireless communication at a first wireless device, including a memory and at least one processor coupled to the memory. The memory and the at least one processor coupled to the memory may be configured to receive a list including one or more UEs from a second wireless device having overlapping beam coverage with a first UE that communicates with the first wireless device. The memory and the at least one processor coupled to the memory may be further configured to transmit a user grouping identifying the second wireless device and the one or more UEs to the first UE.

Aspect 15 is the apparatus of aspect 14, further including a transmitter, where the first wireless device may include a first BS and the second wireless device may include a second BS.

Aspect 16 is the apparatus of aspect 15, where the memory and the at least one processor coupled to the memory may be further configured to transmit, to the first UE, a signal including at least one of an RE or an RB. The memory and the at least one processor coupled to the memory may be further configured to receive, from the first UE, a request for missing information from the at least one of the RE or the RB. The memory and the at least one processor coupled to the memory may be further configured to retransmit, to the first UE, at least a portion of the missing information from the at least one of the RE or the RB.

Aspect 17 is the apparatus of any of aspects 15 to 16, where the memory and the at least one processor coupled to the memory may be further configured to transmit, to the first UE, a signal including at least one of an RE or an RB.

The memory and the at least one processor coupled to the memory may be further configured to receive, from the second BS via at least one of an Xn interface or an X2 interface, a request for missing information from the at least one of the RE or the RB. The memory and the at least one processor coupled to the memory may be further configured to transmit, to the second BS via the at least one of the Xn interface or the X2 interface, at least a portion of the missing information from the at least one of the RE or the RB.

Aspect 18 is the apparatus of any of aspects 15 to 17, where, for each UE in the list including one or more UEs, the list includes at least one of a DMRS configuration, a scrambling code, a PDCCH configuration, or a CSI-RS configuration.

Aspect 19 is the apparatus of any of aspects 15 to 18, where the memory and the at least one processor coupled to the memory may be further configured to indicate a set of CSI-RS resources to a second UE, where the list including the one or more UEs includes the second UE. The memory and the at least one processor coupled to the memory may be further configured to receive, from the second UE, a set of at least one lower interference beams and a set of at least one higher interference beams based on the set of CSI-RS resources. The memory and the at least one processor coupled to the memory may be further configured to transmit to the first UE using a precoder that reduces interference to the second UE.

Aspect 20 is the apparatus of aspect 19, where the memory and the at least one processor coupled to the memory may be further configured to cancel an interference from at least one of the set of at least one higher interference beams for the second UE.

Aspect 21 is the apparatus of any of aspects 15 to 20, where the memory and the at least one processor coupled to the memory may be further configured to transmit, to the first UE, a restriction for one or more beams. The memory and the at least one processor coupled to the memory may be further configured to receive, from the first UE, CSF for one or more non-restricted beams.

Aspect 22 is the apparatus of any of aspects 15 to 20, where the memory and the at least one processor coupled to the memory may be further configured to reduce a rank of the first UE based on at least one of a service tolerance or a delay tolerance of a first UE and the second UE.

Aspect 23 is a method of wireless communication for implementing any of aspects of 1 to 22.

Aspect 24 is an apparatus for wireless communication including means for implementing any of aspects 1 to 22.

Aspect 25 is a computer-readable medium storing computer executable code, where the code when executed by a processor causes the processor to implement any of aspects 1 to 22.

What is claimed is:

1. An apparatus for receiving wireless communication at a first user equipment (UE) from a first wireless device, comprising:
   memory; and
   at least one processor coupled to the memory and configured to:
   receive a user grouping message identifying a second UE that communicates with a second wireless device;
   receive a control transmission message between the second UE and the second wireless device indicating a modulation and coding scheme (MCS) and allocated resources for the second wireless device;
   decode the control transmission message based on the user grouping message; and
   apply interference cancellation on at least one of a resource element (RE) or a resource block (RB) received from the first wireless device based on the MCS and the allocated resources for the second wireless device indicated by the decoded control transmission message.

2. The apparatus of claim 1, further comprising a transmitter, wherein the first wireless device comprises a first base station (BS) and the second wireless device comprises a second BS.

3. The apparatus of claim 2, wherein the control transmission message comprises one or more of a radio resource control (RRC) message and a downlink control information (DCI) message.

4. The apparatus of claim 1, wherein the control transmission message comprises downlink control information (DCI) that is common to both the first UE and the second UE.

5. The apparatus of claim 1, wherein to decode the control transmission message based on the user grouping message, the at least one processor is configured to:
   decode downlink control information (DCI) based on a scrambling ID of the second UE.

6. The apparatus of claim 2, wherein least one processor is further configured to:
   transmit, to the first BS, a request for missing information from the at least one of the RE or the RB received from the first BS in response to an interference cancellation failure on the at least one of the RE or the RB received from the first BS; and
   receive, from the first BS, a missing information message comprising at least a portion of the missing information from the at least one of the RE or the RB received from the first BS.

7. The apparatus of claim 2, wherein the at least one processor is further configured to:
   transmit, to the second BS, a request to retrieve, using at least one of an Xn interface or an X2 interface, missing information from the at least one of the RE or the RB received from the first BS in response to an interference cancellation failure on the at least one of the RE or the RB received from the first BS; and
   receive, from the second BS, a missing information message comprising at least a portion of the missing information from the at least one of the RE or the RB received from the first BS.

8. The apparatus of claim 2, wherein the user grouping message includes a grouping based on an area of overlapped beam coverage from the first BS and the second BS.

9. The apparatus of claim 2,
   wherein the user grouping message identifies a set of one or more UEs,
   wherein the set of one or more UEs includes the first UE and the second UE, and
   wherein, for each UE identified in the set of one or more UEs, the user grouping message further identifies at least one of:
   a demodulation reference signal (DMRS) configuration,
   a scrambling code,
   a physical downlink control channel (PDCCH) configuration, or
   a channel state information reference signal (CSI-RS) configuration.

10. The apparatus of claim 2, wherein the at least one processor is further configured to:
- receive a set of one or more CSI-RS resources from the second BS; and
- transmit, to the second BS, a set of at least one lower interference beams and a set of at least one higher interference beams based on the set of one or more CSI-RS resources.

11. The apparatus of claim 2, wherein the at least one processor is further configured to:
- receive a restricted set of one or more beams;
- search for a precoding matrix indicator (PMI) on one or more non-restricted beams; and
- transmit feedback on the one or more non-restricted beams to the second BS.

12. The apparatus of claim 1, further comprising a transmitter, wherein the first wireless device comprises a third UE and wherein the second wireless device comprises a fourth UE.

13. The apparatus of claim 12, wherein the control transmission message comprises a sidelink transmission.

14. A method of wireless communication at a first user equipment (UE), comprising:
- receiving a user grouping message identifying a second UE that communicates with a second wireless device;
- receiving a control transmission message between the second UE and the second wireless device indicating a modulation and coding scheme (MCS) and allocated resources for the second wireless device;
- decoding the control transmission message based on the user grouping message; and
- applying interference cancellation on at least one of a resource element (RE) or a resource block (RB) received from a first wireless device based on the MCS and the allocated resources for the second wireless device indicated by the decoded control transmission message.

15. The method of claim 14, wherein the first wireless device comprises a first base station (BS) and the second wireless device comprises a second BS.

16. The method of claim 15, further comprising:
- transmitting, to the first BS, a request for missing information from the at least one of the RE or the RB received from the first BS in response to an interference cancellation failure on the at least one of the RE or the RB received from the first BS; and
- receiving, from the first BS, a missing information message comprising at least a portion of the missing information.

17. The method of claim 15, further comprising:
- transmitting, to the second BS, a request to retrieve, using at least one of an Xn interface or an X2 interface, missing information from the at least one of the RE or the RB received from the first BS in response to an interference cancellation failure on the at least one of the RE or the RB received from the first BS; and
- receiving a missing information message comprising at least a portion of the missing information from the second BS.

18. The method of claim 15, further comprising:
- receiving a set of one or more channel state information reference signal (CSI-RS) resources from the second BS; and
- transmitting, to the second BS, a set of at least one lower interference beams and a set of at least one higher interference beams based on the set of one or more CSI-RS resources.

* * * * *